(12) United States Patent
Ip et al.

(10) Patent No.: US 10,012,520 B2
(45) Date of Patent: Jul. 3, 2018

(54) AUTOMATED TEST SYSTEMS AND METHODS UTILIZING IMAGES TO DETERMINE LOCATIONS OF NON-FUNCTIONAL LIGHT-EMITTING ELEMENTS IN LIGHT-EMITTING ARRAYS

(71) Applicants: Henry Ip, Richmond (CA); Michael A. Tischler, Vancouver (CA); Chi Wai Ho, New Westminster (CA)

(72) Inventors: Henry Ip, Richmond (CA); Michael A. Tischler, Vancouver (CA); Chi Wai Ho, New Westminster (CA)

(73) Assignee: COOLEDGE LIGHTING INC., Richmond, British Columbia (CA)

( * ) Notice: Subject to any disclaimer, the term of this patent is extended or adjusted under 35 U.S.C. 154(b) by 255 days.

(21) Appl. No.: 14/949,089

(22) Filed: Nov. 23, 2015

(65) Prior Publication Data
US 2016/0161294 A1    Jun. 9, 2016

Related U.S. Application Data

(60) Provisional application No. 62/085,762, filed on Dec. 1, 2014.

(51) Int. Cl.
| | |
|---|---|
| *G01J 1/42* | (2006.01) |
| *G01D 5/34* | (2006.01) |
| *G01J 3/46* | (2006.01) |
| *G01J 3/50* | (2006.01) |
| *G01J 3/28* | (2006.01) |

(52) U.S. Cl.
CPC .................. *G01D 5/34* (2013.01); *G01J 1/42* (2013.01); *G01J 3/465* (2013.01); *G01J 3/505* (2013.01); *G01J 2001/4252* (2013.01); *G01J 2003/2813* (2013.01)

(58) Field of Classification Search
CPC ...... G01D 5/34; G01J 1/42; G01J 2001/4252; G01J 2003/2813; G01J 3/465; G01J 3/505; G01J 3/501; G01J 3/524
USPC ..................... 250/205, 214 R, 221
See application file for complete search history.

(56) References Cited

U.S. PATENT DOCUMENTS

| | | | |
|---|---|---|---|
| 7,965,884 B2 | 6/2011 | Wu et al. | |
| 8,823,406 B2 | 9/2014 | Bolt et al. | |
| 2003/0161163 A1 | 8/2003 | Hussey et al. | |
| 2004/0063373 A1 | 4/2004 | Johnson et al. | |
| 2004/0135107 A1 | 7/2004 | Bennewitz et al. | |
| 2007/0188425 A1* | 8/2007 | Saccomanno ........ | G09G 3/3406 345/82 |
| 2007/0216704 A1* | 9/2007 | Roberts ................ | G09G 3/3426 345/597 |
| 2009/0236506 A1* | 9/2009 | Dudgeon .................. | G01J 1/42 250/228 |

(Continued)

FOREIGN PATENT DOCUMENTS

CA    2807576 A1    2/2012

OTHER PUBLICATIONS

International Search Report and Written Opinion issued in a corresponding International Application No. PCT/US2015/002452 dated May 2, 2016.

*Primary Examiner* — Que T Le
(74) *Attorney, Agent, or Firm* — Morgan, Lewis & Bockius LLP

(57) ABSTRACT

In accordance with certain embodiments, multiple light-emitting elements of a light-emitting device are tested via imaging and image analysis.

26 Claims, 11 Drawing Sheets

(56) References Cited

U.S. PATENT DOCUMENTS

| | | | |
|---|---|---|---|
| 2010/0215264 A1* | 8/2010 | Nakamura | H04N 1/646 |
| | | | 382/167 |
| 2012/0249776 A1 | 10/2012 | Ji et al. | |
| 2013/0201321 A1 | 8/2013 | Chao et al. | |
| 2015/0017748 A1 | 1/2015 | Ji et al. | |

* cited by examiner

AUTOMATED TEST SYSTEMS AND METHODS UTILIZING IMAGES TO DETERMINE LOCATIONS OF NON-FUNCTIONAL LIGHT-EMITTING ELEMENTS IN LIGHT-EMITTING ARRAYS

RELATED APPLICATION

This application claims the benefit of and priority to U.S. Provisional Patent Application No. 62/085,762, filed Dec. 1, 2014, the entire disclosure of which is hereby incorporated herein by reference.

FIELD OF THE INVENTION

In various embodiments, the present invention generally relates to test systems for array-based optoelectronic devices.

BACKGROUND

Array-based light-emitting systems present unique testing challenges. One challenge is to determine the electrical and optical characteristics of both the full array and the individual light emitters. Determining the array characteristics becomes more difficult as the physical size of the array increases. One standard characterization technique for light emitters is the use of an integrating sphere, in which all of the light emitters are simultaneously energized and the optical characteristics of the array as a whole are determined. Thus, for array-level measurements, integrating spheres may be used, but with a number of limitations.

Large integrating spheres that are, for example, 1 or 2 meters in diameter, are available, but these are expensive and may still be insufficient for very large arrays having one or two lateral dimensions on the order of meters. Arrays on flexible substrates may be curled or folded to fit into a sphere, but this requires manual handling, decreases throughput, and possibly introduces inaccuracy or reproducibility issues in the measurements. In particular, variations in the physical configuration of the array will require the generation of new calibration files, again reducing throughput and increasing testing costs. Arrays on rigid substrates simply may be too large to fit within an available sphere. Another concern is that integrating sphere measurements typically require a relatively long duration, in part because of the need to provide sufficient time for the system to reach thermal equilibrium. Such equilibration times may be on the order of tens of minutes, resulting in relatively low throughput of the test system.

In order to characterize each light emitter individually, the light from each light emitter must be analyzed separately, which cannot be done in a full sphere measurement of the array. One approach to addressing this problem is to individually energize each LED for its own measurement. However, this may require special or additional wiring on the array circuit board that is only used for testing purposes, adding further cost to the lighting system. Another approach is to energize the array and measure each light emitter separately with a small integrating sphere that covers only one light emitter at a time. Obviously such approaches can take a great deal of time for a large array, and may also not be able to achieve the required level of accuracy because of the relative size of the sphere to the light emitter.

In view of the foregoing, a need exists for systems and techniques enabling the characterization of array-based lighting systems capable of providing high accuracy and throughput at low cost.

SUMMARY

In accordance with certain embodiments, test systems and procedures are described for automated testing and evaluation of array-based light-emitting systems and devices. Multiple (or even all) of the light-emitting elements of such devices are evaluated substantially simultaneously, thereby providing information regarding one or more optical and/or electrical characteristics of the light-emitting elements in a single measurement. The measurement may also provide collective optical and/or electrical characteristics of all or a portion of the device itself. For example, light-emitting elements of an array-based device may be energized, resulting in light emission from the elements. The light from the array of light-emitting elements may be captured, e.g., within an image of the light-emitting elements or via a sensor or a plurality of individual sensors (that each may correspond to—e.g., detect the light outputs of—one or more of the light-emitting elements). The resulting image or simultaneously acquired data is analyzed to determine one or more optical and/or electrical characteristics of the light-emitting elements, and may be utilized to determine one or more collective and/or electrical characteristics of the device as a whole. The acquired data may be utilized to determine the presence and location of light-emitting elements that are non-functional (i.e., that are either not emitting light or emitting light of having one or more undesired characteristics, and/or that are outside of specification or a target range for one or more characteristics).

In an aspect, embodiments of the invention feature a testing system for testing a light-emitting device comprising a plurality of discrete light-emitting elements disposed over a substrate. The testing system includes or consists essentially of a power source for energizing at least some of the discrete light-emitting elements, an imaging system, and an analyzer. The imaging system has a field of view and is configured to acquire at least one image of all of the energized light-emitting elements within the field of view during energization thereof. The analyzer determines, from the at least one image, an optical characteristic of one or more of the imaged light-emitting elements. The optical characteristic includes, consists essentially of, or consists of radiant flux, luminous flux, one or more tristimulus color values, chromaticity coordinates, peak wavelength, dominant wavelength, correlated color temperature, color rendering index, and/or R9. The analyzer is configured to, from the at least one image, determine locations of non-functional light-emitting elements.

Embodiments of the invention may include one or more of the following in any of a variety of combinations. The analyzer may be configured to determine locations of non-functional light-emitting elements having at least one optical characteristic that is outside of a target range. The target range may be pre-defined and stored within a memory of the analyzer. The target range may be determined at least in part from at least one optical characteristic of one or more of the imaged light-emitting elements. The analyzer may determine, from the at least one image, an optical characteristic of each of the imaged light-emitting elements. The analyzer may be configured to determine, from the at least one image, a collective optical characteristic of the imaged light-emitting elements. A probe card may be configured to electrically couple the power source to the light-emitting device. The imaging system may include or consist essentially of a camera and/or an imaging colorimeter. The at least one image may consist essentially of or consist of a single greyscale image of the imaged light-emitting elements. The at least one image may include, consist essentially of, or consist of at least three images. Each of the at least three images may include, consist essentially of, or consist of a tri stimulus image.

The testing system may include a housing for at least partially enclosing therewithin at least some of the light-emitting elements. An interior surface of the housing may be absorbent to a wavelength of light emitted by the light-emitting elements. The housing may substantially prevent transmission of ambient light into an interior of the housing. A temperature within the housing may be stabilized to within ±5° C. The housing may include an intake assembly for receiving the substrate at a first end of the housing and an output assembly for dispensing the substrate at a second end of the housing. The substrate may have the form of a continuous web. The analyzer may be configured to detect, from the at least one image, a physical characteristic of the light-emitting device. The physical characteristic may include, consist essentially of, or consist of a temperature of at least one light-emitting element, a temperature of at least a portion of the substrate, a missing light-emitting element, a misoriented light-emitting element, one or more fiducial marks on the substrate, one or more marks on the substrate indicating an out-of-specification component, and/or a bar code disposed on the substrate. The analyzer may be configured to determine (e.g., via one or more electrical measurements) an electrical characteristic of the light-emitting device. The electrical characteristic may include, consist essentially of, or consist of current supplied to at least one light-emitting element, voltage drop across at least one light emitting element, current supplied to the energized light-emitting elements, voltage drop across the energized light-emitting elements, power supplied to at least one light-emitting element, and/or power supplied to the energized light-emitting elements.

The light-emitting device may include or consist essentially of (i) a first and second spaced-apart power conductors, and (ii) a plurality of light-emitting strings. Each light-emitting string (a) may include or consist essentially of a plurality of interconnected light-emitting elements spaced along the light-emitting string, (b) may have a first end electrically coupled to the first power conductor, and (c) may have a second end electrically coupled to the second power conductor. The power conductors may supply power to each of the light-emitting strings. The power source may be configured to energize the energized light-emitting elements by energizing at least a portion of at least one light-emitting string. The power source may be configured to energize the energized light-emitting elements by (i) energizing a first portion of a light-emitting string and, thereafter, (ii) energizing a second portion of the light-emitting string. The first and second portions may collectively include all light-emitting elements in the light-emitting string. The imaging system may be configured to (i) acquire a first image when the first portion of the light-emitting string is energized and (ii) acquire a second image when the second portion of the light-emitting string is energized. The power source may be configured to energize the energized light-emitting elements by energizing at least said portion of at least one light-emitting string without energizing any light-emitting elements not disposed within the at least one light-emitting string. The light-emitting device may include a plurality of control elements each (i) electrically connected to at least one light-emitting string and (ii) configured to utilize power supplied from the power conductors to control the current to the at least one light-emitting string to which it is electrically connected.

The testing system may include a supply roll and a take-up roll. The supply roll may supply the light-emitting device to the testing system. The take-up roll may receive the light-emitting device after testing. The imaging system may be positioned to (i) receive at least a portion of the light-emitting device from the supply roll and (ii) supply the at least a portion of the light-emitting device to the take-up roll after testing. The testing system may include a fabrication module for at least partially fabricating the light-emitting device. The supply roll may supply the substrate in the form of a continuous web to the fabrication module. The imaging system may be positioned to receive at least a portion of the light-emitting device after fabrication thereof in the fabrication module. The imaging system may include or consist essentially of (i) a detector and (ii) a lens for focusing the at least one image on the detector. The analyzer may be configured to determine, from the at least one image, a dimming performance, a color tuning performance, a temperature, and/or a response to a communication and/or control signal of the imaged light-emitting elements. The testing system may include one or more calibration light-emitting elements for providing a calibration source for at least one optical characteristic to the analyzer. The testing system may include a temperature controller to change a temperature of the light-emitting elements before the at least one image is acquired.

The testing system may include a spectrometer for acquiring a spectrum (i.e., a measurement of light intensity as a function of wavelength or frequency) corresponding to light emitted by the energized light-emitting elements within a field of view of the spectrometer during energization of the light-emitting elements. The analyzer may determine, from the spectrum acquired by the spectrometer, a collective optical characteristic of the energized light-emitting elements. The analyzer may determine, from the at least one image acquired by the imaging system, an individual optical characteristic of each of the imaged light-emitting elements. The field of view of the spectrometer may be substantially the same as the field of view of the imaging system.

In another aspect, embodiments of the invention feature a testing system for testing a light-emitting device including or consisting essentially of a plurality of discrete light-emitting elements disposed over a substrate. The testing system includes or consists essentially of a power source for energizing at least some the plurality of discrete light-emitting elements, an imaging system for acquiring an image of at least a some of the energized light-emitting elements during energization thereof, and an analyzer for determining, from the image, an optical characteristic of each of the imaged light-emitting elements.

Embodiments of the invention may include one or more of the following in any of a variety of combinations. The testing system may include a housing for at least partially enclosing therewithin at least some of the light-emitting elements. An interior surface of the housing may be absorbent to a wavelength of light emitted by the light-emitting elements. The housing may substantially prevent transmission of ambient light into an interior of the housing. The housing may include an intake assembly for receiving the substrate at a first end of the housing and an output assembly for dispensing the substrate at a second end of the housing. The substrate may have the form of a continuous web. The analyzer may be configured to determine, from the image, a collective optical characteristic of the imaged light-emitting elements. The optical characteristic may include, consist essentially of, or consist of radiant flux, one or more tristimulus color values, chromaticity coordinates, luminous flux, peak wavelength, correlated color temperature, color rendering index, and/or R9.

The imaging system may include or consist essentially of a camera and/or an imaging colorimeter. The analyzer may be configured to, from the image, determine locations of the light-emitting elements. The analyzer may be configured to, from the image, determine locations of non-functional light-emitting elements. The testing system may include a supply roll, a fabrication module, and/or a take-up roll. The supply roll may supply the substrate in the form of a continuous web. The fabrication module may at least partially fabricate the light-emitting device. The take-up roll may receive the light-emitting device after testing. The imaging system may be positioned to receive at least a portion of the light-emitting device after fabrication thereof in the fabrication module. The imaging system may be positioned to supply the at least a portion of the light-emitting device to the take-up roll after testing. The imaging system may include or consist essentially of (i) a detector and (ii) a lens for focusing the image on the detector. The imaging system may include or consist essentially of an imaging colorimeter. The image may include, consist essentially of, or consist of at least three tri-stimulus images. The image may consist essentially of or consist of a single greyscale image.

In yet another aspect, embodiments of the invention feature a method of testing a light-emitting device including or consisting essentially of a plurality of discrete light-emitting elements disposed over a substrate. Power is supplied to at least some of the light-emitting elements of the light-emitting device for energization thereof. Thereduring, an image of at least some of the energized light-emitting elements is acquired. The image is analyzed to determine an optical characteristic of at least one of the energized light-emitting elements.

Embodiments of the invention may include one or more of the following in any of a variety of combinations. The image may be acquired by an imaging system. During acquisition of the image, light other than light emitted by the energized light-emitting elements may be substantially prevented from reaching the imaging system. The image may be analyzed to determine a location, on the light-emitting device, of a non-functional energized light-emitting element. The image may be analyzed to determine a collective optical characteristic of the energized light-emitting elements. The optical characteristic may include, consist essentially of, or consist of radiant flux, one or more tri stimulus color values, chromaticity coordinates, luminous flux, peak wavelength, correlated color temperature, color rendering index, and/or R9. The image may be acquired while at least a portion of the light-emitting device is disposed within or travels through a housing. The substrate may have the form of a continuous web. The substrate may be supplied to the housing as part of a roll-to-roll process. After the image is acquired, the imaged portion of the light-emitting device may be received onto a take-up roll. Analyzing the image may include or consist essentially of (i) identifying areas of the image having a brightness larger than a threshold value, and (ii) correlating the identified areas to positions of light-emitting elements.

Supplying power to at least some of the light-emitting elements of the light-emitting device may include or consist essentially of contacting a plurality of different points on the light-emitting device with a plurality of probes. Supplying power to at least some of the light-emitting elements of the light-emitting device may include or consist essentially of contacting a plurality of different points on the light-emitting device with a probe card. The probe card may include or consist essentially of (i) a plurality of probes and (ii) a probe-card substrate on which the probes are disposed. The probe-card substrate may be substantially transparent to a wavelength of light emitted by the light-emitting elements. The image may be acquired by an imaging system. A size of at least a portion of the light-emitting device may be selected for imaging based at least in part on (i) a resolution of the imaging system and (ii) a spacing of the light-emitting elements, whereby, within the image, a number of pixels corresponding to each light-emitting element may be greater than a threshold number of pixels. A spectrum corresponding to light emitted by the energized light-emitting elements may be acquired. The spectrum may be analyzed to determine a collective optical characteristic of the energized light-emitting elements. The image may be analyzed to determine an individual optical characteristic of each of the energized light-emitting elements. The spectrum may be acquired by a spectrometer, and the image may be acquired by an imaging system including or consisting essentially of a camera and/or an imaging colorimeter.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. As used herein, the terms "about," "approximately," and "substantially" mean±10%, and in some embodiments, ±5%. The term "consists essentially of" means excluding other materials that contribute to function, unless otherwise defined herein. Nonetheless, such other materials may be present, collectively or individually, in trace amounts.

Herein, two components such as light-emitting elements and/or optical elements being "aligned" or "associated" with each other may refer to such components being mechanically and/or optically aligned. By "mechanically aligned" is meant coaxial or situated along a parallel axis. By "optically aligned" is meant that at least some light (or other electromagnetic signal) emitted by or passing through one component passes through and/or is emitted by the other. Substrates, light sheets, components, and/or portions thereof described as "reflective" may be specularly reflective or diffusively reflective unless otherwise indicated.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1A:
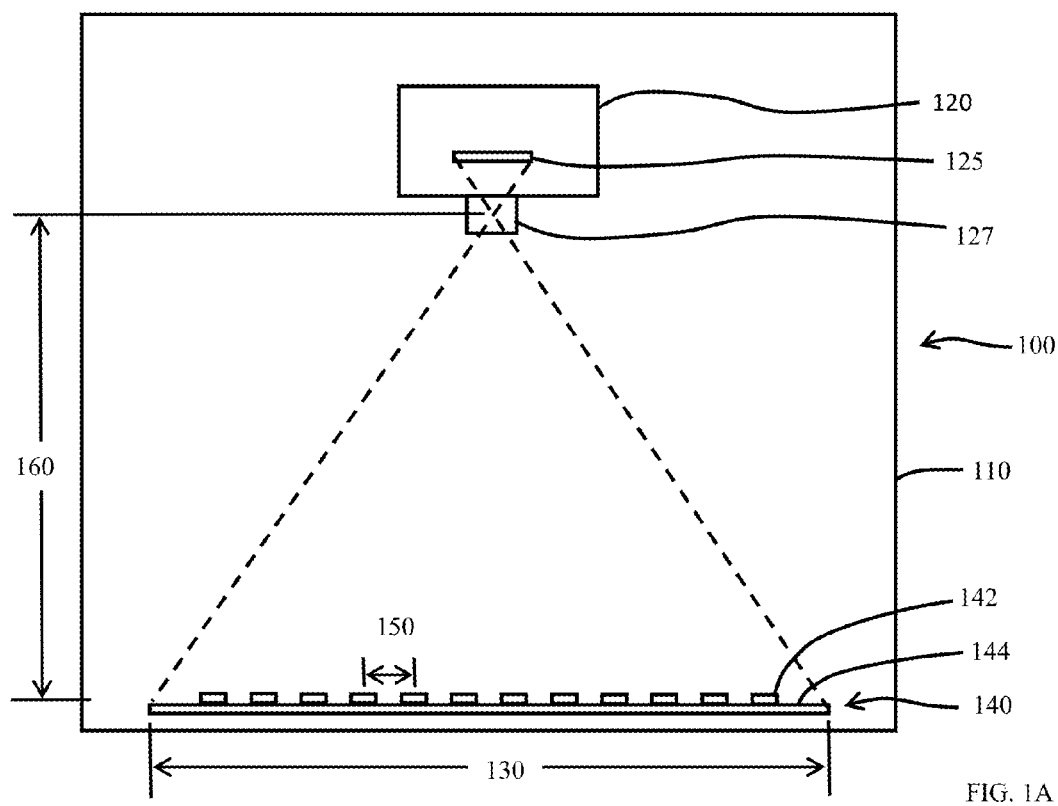
FIGS. 1A-1C are schematic illustrations of testing systems in accordance with various embodiments of the invention.

FIG. 1A shows a schematic cross-sectional view of a test system 100 in accordance with various embodiments of the present invention. As shown, test system 100 includes a camera (or "imaging system") 120 having a detector (or "image sensor") 125 and a lens 127 that produces an image (on detector 125, for example) of a sample 140 positioned within a viewing area 130. In various embodiments, viewing area 130 may have a square or rectangular shape; however, this is not a limitation of the present invention, and in other embodiments the viewing area 130 may have other shapes, such as circular, triangular, or an arbitrary shape. Camera 120 is spaced away from the sample 140 by a viewing distance 160. In various embodiments of the present invention, sample 140 includes or consists essentially of a substrate 144 and an array of light-emitting elements (LEEs) 142 formed over substrate 144, for example as described in U.S. patent application Ser. No. 13/799,807, filed on Mar. 13, 2013, and U.S. patent application Ser. No. 13/970,027, filed on Aug. 19, 2013, the entire disclosure of each of which is hereby incorporated by reference. In various embodiments, the spacing (or "pitch") between the LEEs 142 is constant or substantially constant, for example where spacing or pitch 150 is the distance between adjacent LEEs 142. However, this is not a limitation of the present invention, and in other embodiments the spacing between LEEs 142 may vary. While FIG. 1A shows the viewing distance 160 as being defined from the top of LEEs 142 to the focal point of lens 127, this is not a limitation of the present invention, and in other embodiments the viewing distance 160 may be defined differently. In various embodiments of the present invention, all or a portion of the test system is enclosed in a housing 110, which, in various embodiments, may also house sample 140 or a portion of sample 140 during testing.

In various embodiments of the present invention, camera 120 includes or consists essentially of a digital or film camera or an imaging colorimeter, for example a ProMetric G2, G3, or I8 imaging colorimeter from Radiant Vision Systems. In various embodiments of the present invention, the spatial resolution of test system 100 is determined by the field of view (i.e., the viewing area 130) and the resolution of imaging system 120. In various embodiments, imaging system 120 may image the field of view onto a detector 125 having an array of m×n pixels, where m and n are the number of pixels in orthogonal directions (x, y), and a field of view of a×b, where a and b are the orthogonal dimensions of viewing area 130 imaged by imaging system 120. In this case, the resolution in the x-direction, i.e., the length of the region in the x-direction represented by one pixel, may be given approximately by a/m, while the resolution in the y-direction, i.e., the length of the region in the y-direction represented by one pixel, may be given approximately by b/n. In various embodiments, the imaging system 120 may include one or more lenses or optical elements 127 configured to focus an image of sample 140 or a portion of sample 140 onto detector 125 within the imaging system 120. In various embodiments, the imaging system 120 may include other optical elements, for example filters, shutters, mirrors, or the like. In various embodiments, detector 125 may be an electro-optical detector, e.g., a semiconductor detector such as a CMOS or CCD imager; however, this is not a limitation of the present invention, and in other embodiments detector 125 and/or imaging system 120 may be a film-based system or other imaging system.

Figure 1B:
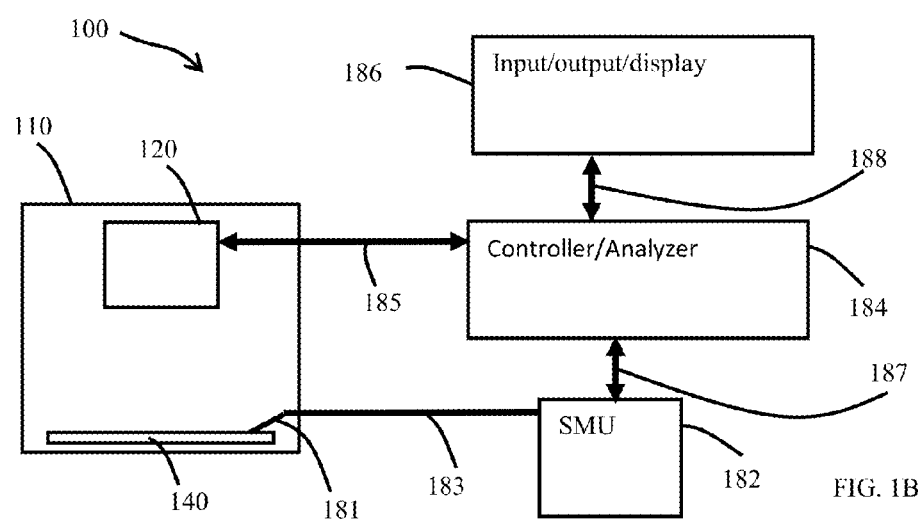

FIG. 1B is an expanded schematic diagram of test system 100 in accordance with various embodiments of the present invention. As shown, test system 100 includes a controller/analyzer 184, an input/output/display 186, and a source measure unit (SMU) 182 (i.e., a unit 182 capable of sourcing (providing power to) and measuring (for example measuring a voltage or current of) sample 140 at the same time). In various embodiments, test sample 140 may be energized or partially energized by SMU 182; however, this is not a limitation of the present invention, and in other embodiments other means may be used to energize or partially energize sample 140, for example a power supply, a current supply or constant current supply, a voltage supply or a constant voltage supply, or the like. In various embodiments of the present invention, SMU 182 may provide a constant or time-varying or pulsed current or voltage to sample 140. In various embodiments of the present invention, one or more electrical characteristics of sample 140 may be determined by SMU 182; however, this is not a limitation of the present invention, and in other embodiments one or more electrical characteristics of sample 140 may be determined by other means, for example a voltage meter, an oscilloscope, a current meter, an ohm meter, or the like. In various embodiments, sample 140 may be energized while measuring one or more electrical characteristics. In various embodiments of the present invention, power to sample 140 may be provided from SMU 182 through an electrical connection 183 (e.g., a cable or a wire) and a probe 181; however, this is not a limitation of the present invention, and in other embodiments power may be provided to sample 140 by other means, for example by wires, connectors, or the like. In various embodiments of the present invention, the functions of SMU 182 may be performed by two or more separate and discrete units, for example a power supply and a measurement system.

In various embodiments of the present invention, the output of camera 120 may be analyzed or conditioned by controller/analyzer 184, for example as discussed herein. In various embodiments of the present invention, controller/analyzer 184 may communicate with and/or control SMU 182 or its equivalent, for example through a communication pathway 187 (e.g., all or a portion of a control bus). In various embodiments of the present invention, controller/analyzer 184 may communicate with and/or control camera 120, for example through communication pathway 185 (e.g., all or a portion of a control bus). In various embodiments of the present invention, controller/analyzer 184 may communicate with and/or be controlled by input/output/display unit 186, for example through communication pathway 188 (e.g., all or a portion of a control bus). In various embodiments of the present invention, input/output/display unit 186 may include or consist essentially of at least one of a keyboard, mouse, display, computer, microcontroller, microprocessor, cellular phone, tablet computing device, or the like. In various embodiments of the present invention, controller/analyzer 184 may include or consist essentially of at least one of a keyboard, mouse, display, computer, microcontroller, microprocessor, cellular phone, tablet computing device, or the like. While FIG. 1B shows one embodiment of a test system of the present invention, the test system components may vary, have different configurations or may have fewer or more elements. For example, FIG. 1B shows controller/analyzer 184 and SMU 182 as two separate units; however, this is not a limitation of the present invention, and in other embodiments controller/analyzer 184 and SMU 182 may be combined into one unit. Similarly, other components of test system 100 may be combined, for example into one or more devices, and/or test system 100 may include additional components not shown in FIG. 1B or many not include all components shown in FIG. 1B. In various embodiments of the present invention, test system 100 may communicate with one or more different systems, for example a manufacturing execution system, an enterprise resource planning system, or the like.

Images acquired by the imaging system 120 may be analyzed to determine a collective optical characteristic of the sample 140 (or the portion of sample 140 within viewing area 130) and/or optical characteristics of each of the LEEs 142 of the sample 140 or the portion of sample 140 within viewing area 130 or groups of LEEs 142 of the sample 140. For example, the images may be provided to an analyzer (or "analysis module"), for example controller/analyzer 184 shown in FIG. 1B, that, e.g., identifies LEEs 142 in the image (as described herein) and determines individual optical characteristics of the LEEs 142 from the image. The analyzer may also analyze the entire image to determine a collective optical characteristic of the entire sample 140. The analyzer (and/or other components, e.g., those described in relation to FIG. 1B) in accordance with embodiments of the present invention may include or consist essentially of a general-purpose computing device in the form of a computer including a processing unit (or "computer processor"), a system memory, and a system bus that couples various system components including the system memory to the processing unit. Computers typically include a variety of computer-readable media that can form part of the system memory and be read by the processing unit. By way of example, and not limitation, computer readable media may include computer storage media and/or communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Any suitable programming language may be used to implement without undue experimentation the functions described herein. Illustratively, the programming language used may include assembly language, Ada, APL, Basic, C, C++, C*, COBOL, dBase, Forth, FORTRAN, Java, Modula-2, Pascal, Prolog, Python, REXX, Matlab, Labview, R, and/or JavaScript for example. Further, it is not necessary that a single type of instruction or programming language be utilized in conjunction with the operation of systems and techniques of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general-purpose computer processor, but may utilize any of a wide variety of other technologies including special-purpose hardware, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of embodiments of the invention.

In various embodiments of the present invention, each LEE 142 includes or consists essentially of a bare semiconductor LED die (e.g., a bare-die LEE is an unpackaged semiconductor die), while in other embodiments an LEE 142 includes or consists essentially of a packaged LED. In various embodiments, LEE 142 includes or consists essentially of a packaged surface-mount-device-type LED. In various embodiments of the present invention, an LEE may include or consist essentially of an LED and a light-conversion material such as a phosphor. In various embodiments of the present invention, LEE 142 may include or consist essentially of multiple LEDs within the LEE 142 package, for example each LEE 142 may include 2-5 LEDs; however, the number of LEDs corresponding to a LEE 142 is not a limitation of the present invention, and in other embodiments LEE 142 may include 10 LEDs or 50 LEDs or more. In various embodiments of the present invention, the LEDs within LEE 142 may be tuned to have different correlated color temperature (CCT) or light output intensity. In various embodiments of the present invention, LEE 142 may include LEDs emitting in the red, green, blue wavelength ranges. In various embodiments of the present invention, a LED configured to emit white light may be combined with one or more LEDs configured to emit light in a single color range (i.e., of a single color). In various embodiments of the present invention, an LEE may include or consist essentially of an LED and a light-conversion material, the combination of which produces substantially white light. In various embodiments of the present invention, the white light may have a correlated color temperature (CCT) in the range of about 2000 K to about 15,000 K. In various embodiments of the present invention, LEEs 142 may include or consist essentially of two or more groups of LEEs 142, each group emitting at a different color or a different white CCT. In various embodiments of the present invention, multiple groups of LEEs 142 may be energized separately to permit variation of the color or white-light CCT.

In various embodiments of the present invention, LEE 142 may include or consist essentially of an LED. In various embodiments, LEE 142 may emit electromagnetic radiation within a wavelength regime of interest, for example, infrared (IR), visible, for example blue, red, green, yellow, etc. light or radiation in the ultraviolet (UV) regime, when activated by passing a current through the device. In various embodiments of the present invention, LEE 142 may include or consist essentially of a substrate over which the active device layers are formed. The structure and composition of such layers are well known to those skilled in the art. In general, such a layer structure (e.g., for an LED) may include top and bottom cladding layers, one doped n-type and one doped p-type, and one or more active layers (from which most or all of the light is emitted) in between the cladding layers. In various embodiments, the layers collectively may have a thickness in the range of about 0.25 µm to about 10 µm. In various embodiments of the present invention, the substrate is transparent and all or a portion thereof is left attached to the device layers, while in other embodiments the substrate may be partially or completely removed. In various embodiments of the present invention, LEE 142 may include or consist essentially of one or more nitride-based semiconductors (for example containing two or more of the elements Al, Ga, In, and nitrogen). In various embodiments of the present invention, LEE 142 may include or consist essentially of one or more nitride-based semiconductors (for example containing two or more of the elements Al, Ga, In, and nitrogen) and may emit light in the wavelength range of about 400 nm to about 600 nm or in the range of about 400 nm to about 500 nm.

In various embodiments, LEE 142 may be at least partially covered by a wavelength-conversion material (also referred to herein as a phosphor), phosphor conversion element (PCE), wavelength conversion element (WCE), quantum dot (QD), or phosphor element (PE), all of which are utilized synonymously herein unless otherwise indicated. In various embodiments, white light may also be produced by combining the short-wavelength radiant flux (e.g., blue light) emitted by the semiconductor LED with long-wavelength radiant flux (e.g., yellow light) emitted by, for example one or more phosphors within the wavelength-conversion material. In various embodiments of the present invention, white light may be produced substantially by the light emitted by one or more phosphors in response to excitation by a shorter wavelength source, for example UV or blue light. The chromaticity (or color), color temperature, and color-rendering index are determined by the relative intensities of the component colors. For example, the light color may be adjusted from "warm white" with a correlated color temperature (CCT) of 2700 Kelvin or lower to "cool white" with a CCT of 5,000 Kelvin or greater by varying the type or amount of phosphor material. White light may also be generated solely or substantially only by the light emitted by the one or more phosphor particles within the wavelength-conversion material. In various embodiments, the structure including or consisting essentially of LEE 142 and a wavelength-conversion material may be referred to as a "white die." In some embodiments, white dies may be formed by forming a wavelength-conversion material over and/or around one or more LEEs 110 and then separating this structure into individual white dies as described in U.S. patent application Ser. No. 13/748,864, filed on Jan. 24, 2013, and U.S. patent application Ser. No. 13/949,543, filed on Jul. 24, 2013, the entire disclosure of each of which is incorporated by reference herein. However, this is not a limitation of the present invention, and in other embodiments a wavelength-conversion material may be integrated with an LEE using a variety of different techniques. While LEE 142 has been described as emitting white or substantially white light, this is not a limitation of the present invention, and in other embodiments LEE 142 may emit one or more monochromatic or relatively monochromatic colors, for example red, green, amber, blue, violet, UV, IR or the like, either directly or from one or more wavelength-conversion materials (e.g., phosphors) or in combination with one or more wavelength-conversion materials. The test systems and methods of the present invention are not limited by the color, wavelength, spectral power density or other properties of the test sample, and in particular of LEEs 142.

While the description with respect to FIG. 1A shows imaging system 120 capturing an image of the entire array 140 at once, this is not a limitation of the present invention, and in other embodiments multiple images or a video may be captured of different portions of the array or of the same portion of the array or of multiple arrays. For example, in various embodiments of the present invention, the resolution per LEE 142 may be increased by dividing array 140 into two or more portions and taking separate images of each portion. In various embodiments of the present invention, the multiple images may be merged or stitched together before analysis, while in other embodiments they may be analyzed separately. While this may reduce the throughput of the test system 100, it provides a higher pixel resolution for each partial image. In various embodiments of the present invention, the array may be very large and/or testing may be part of a roll-to-roll process, in which case portions of the array may be imaged separately and/or sequentially.

In various embodiments of the present invention, camera 120 may include or consist essentially of more than one systems, for example a camera and a spectrometer, an imaging spectroradiometer, an imaging colorimeter and a spectrometer, multiple spectrometers, or the like. For example, in various embodiments of the present invention, camera 120 may include an imaging colorimeter that is used to determine the characteristics of each LEE (and may optionally be used to determine characteristics of all or portions of the entire sample within the viewing area) and a spectrometer that collects light from all or a portion of the test sample in aggregate, and may be used to determine characteristics of all or portions of the entire sample within the viewing area. In various embodiments of the present invention, a spectrometer may be used to determine overall characteristics of the test sample, for example CCT, CRI, R9, or the like. In various embodiments of the present invention, camera 120 includes an imaging colorimeter to determine radiant flux and CCT of each LEE 142 and a spectrometer to determine CCT, CRI, and radiant flux of the array. In various embodiments of the present invention, a fiber optic with or without one or more lenses may be utilized to collect light from all or a portion of sample 130 and transmit the collected light to a spectrometer. In various embodiments of the present invention, the spectrometer may be either inside or outside of enclosure 110. In various embodiments of the present invention, an integrating sphere having an input aperture directed at sample 130 may be utilized to collect light from all or a portion of sample 130 and transmit the collected light to a spectrometer. In various embodiments of the present invention, one or more optical elements (e.g., lenses) may be utilized with the integrating sphere to aid in light collection.

Figure 1C:
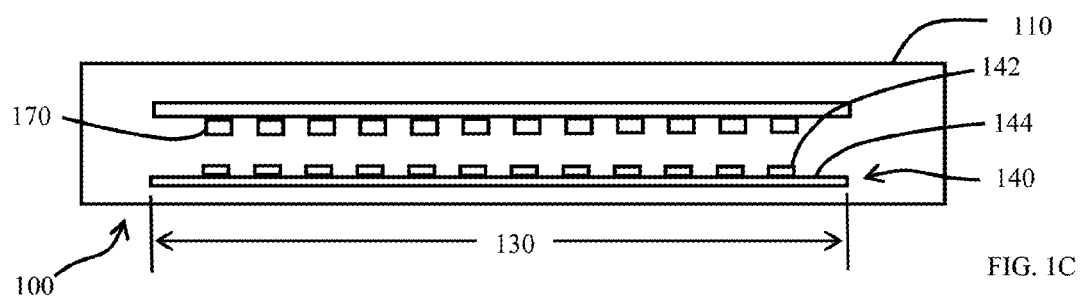

While FIG. 1A shows a camera-based imaging system, this is not a limitation of the present invention, and in other embodiments the system may have other forms. For example, FIG. 1C shows an embodiment of the present invention in which camera 120 is replaced by a non-imaging system that includes a multiplicity of sensors 170, each of which detects at least a portion of light from sample 140, for example at least a portion of light from one or more LEEs 142. In various embodiments, a sensor 170 may detect flux or intensity, for example radiant or luminous flux; however, this is not a limitation of the present invention, and in other embodiments sensor 170 may detect spectral information or intensity and spectral information. For example, in various embodiments, a sensor 170 may include or consist essentially of a fiber optic coupled to a spectrometer. In various embodiments of the present invention, more than one sensing element may be multiplexed with a spectrometer. In various embodiments of the present invention, one sensor element 170 may correspond to (i.e., detect light from and even be substantially physically aligned with) one LEE 142; however, this is not a limitation of the present invention, and in other embodiments there may be more or fewer sensor elements 170 than LEEs 142. In various embodiments of the present invention, the sensors 170 may include multiple sets of sensors, where multiple sensors may each be utilized to detect one or more characteristics of the LEEs 142. For example, in various embodiments of the present invention, one set of sensors may determine the tristimulus X value, another set of sensors may determine the tristimulus Y value and another set of sensors may determine the tristimulus Z value. The combination of the three tristimulus images may also be referred to as a tri stimulus image (in some embodiments of the present invention the tristimulus image may include one or more additional images). In various embodiments of the present invention, such sensors may together or individually detect light from one LEE 142, multiple LEEs 142, or the entire array. In various embodiments of the present invention, the sample may be indexed or moved relative to the sensors or groups of sensors, such that each sensor or group of sensors sequentially detects light from different portions of the sample. In various embodiments of the present invention, each sensor 170 may detect light from only one LEE 142, while in other embodiments each sensor 170 may detect light from more than one LEE 142 or multiple sensors may detect light from each LEE 142.

In various embodiments of the present invention, each sensor 170 may include or consist essentially of an integrating sphere that is optically coupled to one LEE 142. In such embodiments, each integrating sphere may be optically coupled to a spectrometer, for example by a fiber optic, and optical characteristics may be determined for each LEE 142 individually. For example, optical characteristics such as the total output flux, chromaticity, CCT, CRI, R9, R13, etc. may be determined. In various embodiments of the present invention, each integrating sphere may be coupled to two or more (or even all) LEEs 142, but not necessarily to all LEEs 142 in viewing area 130. In various embodiments of the present invention, the measurement throughput may be increased by using multiple cameras or multiple sensors, each of which simultaneously detects a portion of the light emitted by the sample, for example a different portion of the spectrum emitted by the sample. In various embodiments of the present invention, the imaging system may utilize one or more filters to determine the emission color, for example to determine the tristimulus color values or other measures of color or spectral properties. In this case an exposure or image may be acquired through each filter sequentially. In various embodiments of the present invention, the testing throughput may be increased by using multiple cameras, each with a different, and optionally fixed, filter, permitting multiple or all images to be taken simultaneously or substantially simultaneously, thus reducing the time required to generate the color information. Such an approach may be utilized with other types of cameras or sensors, as discussed herein.

Figure 2A:
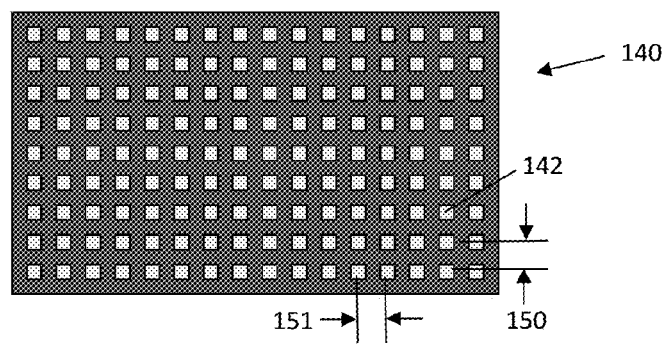
FIG. 2A is a schematic illustration of a test sample in accordance with various embodiments of the invention.

FIG. 2A shows a schematic plan view of one embodiment of a sample 140 including or consisting essentially of a light-emitting array featuring multiple LEEs 142 spaced apart from each other by a substantially constant pitch 150 in one direction and a substantially constant pitch 151 in the orthogonal or substantially orthogonal direction and formed on, over, or within the substrate 144. In this example, pitch 150 is the same as or substantially the same as pitch 151; however, this is not a limitation of the present invention, and in other embodiments pitches 150 and 151 may be different. While FIG. 2A shows LEEs 142 having a square geometry, this is not a limitation of the present invention, and in other embodiments the LEEs 142 may be rectangular, round, triangular, hexagonal, or have any shape. While FIG. 2A shows a light-emitting array in which LEEs 142 are positioned in a square array, this is not a limitation of the present invention, and in other embodiments, LEEs 142 may be positioned in a rectangular array, a hexagonal array, or any arbitrary array.

Figure 2B:
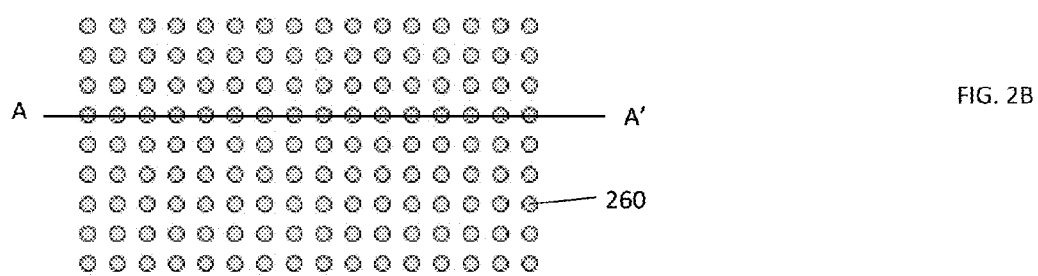
FIG. 2B is a schematic illustration of a test result in accordance with various embodiments of the invention.

FIG. 2B shows a schematic example of an image captured by camera 120. In FIG. 2B, each bright spot 260 corresponds to an individual LEE 142, for example each LEE 142 of the structure shown in FIG. 2A; however, this is not a limitation of the present invention, as will be discussed herein. While FIG. 2B shows the image intensity of each LEE 142 having a round geometry, this is not a limitation of the present invention, and in other embodiments LEEs 142 (and/or the pattern of their illumination) may be square, rectangular, triangular, hexagonal, or have any shape.

Figure 2C:
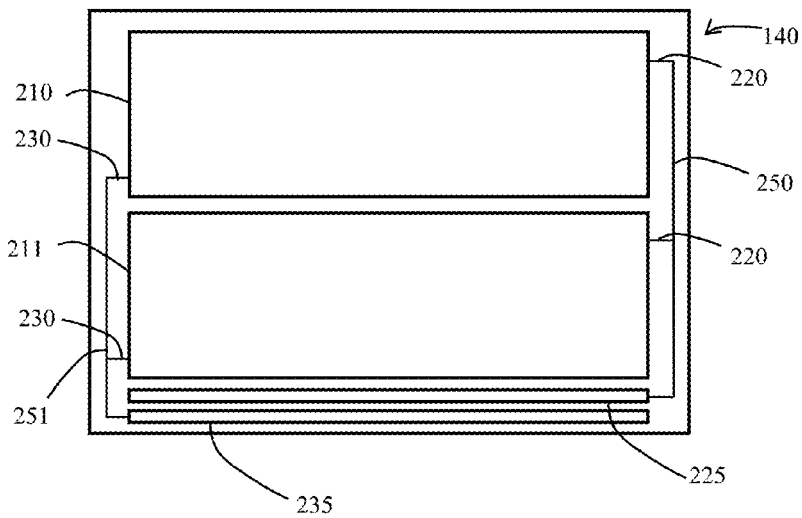
FIG. 2C is a schematic illustration of a test sample in accordance with various embodiments of the invention.

In various embodiments of the present invention, sample 140 may include or consist essentially of one interconnected array of LEEs 142. However, this is not a limitation of the present invention, and in other embodiments sample 140 may include or consist essentially of two or more arrays that may optionally be temporarily electrically coupled together for purposes of analysis, for example to simplify energizing multiple arrays simultaneously, but may be electrically separated after testing. FIG. 2C shows an example of a sample 140 including two arrays 210 and 211. Each array 210, 211 has two power connections 220 and 230, which are electrically coupled together through jumpers 250 and 251. Jumpers 250, 251 are respectively electrically coupled to test pads 225 and 235. In various embodiments of the present invention, jumpers 250 and/or 251 and/or test pads 225 and/or 235 may incorporate one or more electronic components or electronic circuits. In various embodiments of the present invention, such electronic components or electronic circuits may include resistors, capacitors, transistors, integrated circuits, microcontrollers, microprocessors, relays, diodes, or switches, which may control energization of one or more arrays, for example arrays 210 and 211. In various embodiments of the present invention, the test system 100 includes probes or connectors (for example probe 181 in FIG. 1B) that are temporarily electrically coupled to test pads 225 and 235 to energize LEEs 142 on sample 140, for example to energize LEEs 142 on arrays 210 and 211. While FIG. 2C shows two rectangular arrays 210 and 211 having substantially the same size and shape, this is not a limitation of the present invention, and in other embodiments sample 140 may include two or more arrays, where each array may have any shape and size, for example square, triangular, hexagonal, circular, or any arbitrary shape and size. In various embodiments of the present invention, arrays 210 and 211 may be separated after testing, for example by cutting, die cutting, laser cutting, slitting or the like. In various embodiments of the present invention, separated arrays 210 and 211 may not include jumpers 250 and/or 251.

As shown in FIG. 1B, in some embodiments of the present invention test system 100 may include one or more means for energizing sample 140. For example in various embodiments of the present invention, test system 100 may include one or more constant or variable voltage and/or current sources (for example SMU 182) and a means to electrically couple one or more of said sources to sample 140 (for example cable or wiring harness 183 and probe 181). For example, in various embodiments, test system 100 may include one or more electrical connectors or probes that mate with a portion of sample 140, for example to test pads 225 and 235 in FIG. 2C.

In various embodiments of the present invention, the test system 100 is enclosed or partially contained or enclosed in an enclosure 110. In various embodiments of the present invention, all or a portion of the interior of enclosure 110 has a low reflectance to a wavelength of light emitted by LEEs 142. For example, in various embodiments, all or a portion of the interior surface of enclosure 110 is covered with a material that is relatively light-absorbing to a wavelength of light emitted by LEEs 142, for example Light Absorbing Black-Out Material from Edmund Optics. In various embodiments of the present invention, enclosure 110 is light-tight or substantially light-tight, such that light from outside of enclosure 110 (i.e., ambient light) is not detected by camera 120. In various embodiments of the present invention, light leakage into the enclosure may be accommodated by calibration, for example by taking a dark image (that is with the sample in a non-energized state), producing one or more values characteristic of one or more desired parameters (for example luminous flux or radiant flux) and subtracting that from the values determined from the image of the sample in the energized state, to determine the intensity value of the sample itself. In various embodiments of the present invention, enclosure 110 includes one or more doors or openings that permit loading and unloading of sample 140. In various embodiments of the present invention, enclosure 110 may be part of a system that permits semi-automated or automated transfer of sample 140 into and out of enclosure 110. For example, in various embodiments, enclosure 110 may be part of a system including a conveyer belt or track system upon which sample 140 may be conveyed into and out of enclosure 110. In various embodiments of the present invention, the test system 100, with or without enclosure 110, may be part of a roll-to-roll manufacturing system, e.g., such that arrays of LEEs formed on a continuous or substantially continuous substrate are fed into the testing system 100. In various embodiments of the present invention, enclosure 110 may include one or more ports or openings to permit movement of a continuous or semi-continuous web or sheet through test system 100. In various embodiments of the present invention, such ports may have one or more light baffles, doors, seals or the like, to reduce or eliminate the introduction of light into enclosure 110.

In various embodiments of the present invention, sample 140 is kept at a constant or relatively constant temperature during the measurement, for example during the image capture during energization of the LEEs 142. In various embodiments, the temperature of sample 140 is kept constant to within ±5° C., or to within ±2° C., or to within ±1° C. In various embodiments of the present invention, the target measurement temperature is approximately 25° C.; however, this is not a limitation for the present invention, and in other embodiments other target temperatures may be used. In various embodiments, the temperature within enclosure 110 is kept constant to within ±5° C., or to within ±2° C., or to within ±1° C. In various embodiments of the present invention, enclosure 110 may be insulated or partially insulated to aid in reducing temperature variations. In various embodiments of the present invention, a heater and/or cooler or heater and/or cooler plate may be incorporated under sample 140 to aid in maintaining sample 140 at a constant or substantially constant temperature. In various embodiments of the present invention, a heater and/or cooler may be incorporated in enclosure 110 to aid in maintaining sample 140 at a constant or substantially constant temperature. In various embodiments of the present invention, hot and/or cooled air may be introduced into enclosure 110 to aid in maintaining sample 140 at a constant or substantially constant temperature. In various embodiments of the present invention, one or more temperature sensors may be incorporated within enclosure 110 and/or on or near sample 140 or on or within a heater and/or cooler plate under sample 140. In various embodiments of the present invention, such temperature sensors may be used to provide sample temperature information to the analysis or control unit, for example to permit calibration and/or scaling of the test data as a function of temperature. In various embodiments of the present invention, such temperature sensors may be used as part of an active or passive temperature control system within enclosure 110, or within the region of sample 140, for example by the use of a heater and/or cooler plate below sample 140. For example, in various embodiments, measurements may only be acquired by test system 100 when sample 140 reaches a particular temperature or temperature range sensed by a temperature sensor or has maintained a particular temperature or remained within a particular temperature range for a specified period of time. In various embodiments of the present invention, the heating and/or cooling system, for example heaters, coolers, fans, etc. may be turned off during the measurement period, for example to prevent interference from the temperature control system during the measurement period. In various embodiments, the temperature control system settings may be modified during the measurement period, for example turning down the level of a fan providing air circulation, for example to prevent interference from the temperature control system with the measurements. In various embodiments of the present invention, the temperature control system may be turned off or the settings may be modified in a time period before and/or after the measurement period, for example in addition to modifying or turning off the temperature control system during the measurement period.

In various embodiments of the present invention, test system 100 may be used for analysis of samples 140 emitting white or substantially white light. For example, sample 140 may emit light having a correlated color temperature (CCT) in the range of about 2000K to about 20,000K. In various embodiments of the present invention, test system 100 may be used for analysis of samples 140 emitting relatively monochromatic radiation, for example emitting one or more colors such as red, green, blue, yellow, violet, UV, IR, and the like. In various embodiments, LEEs 142 and/or sample 140 may emit light in one or more wavelengths or wavelength ranges outside of the visible wavelength range, for example in the UV or IR or x-ray range. The wavelength range to be analyzed is not a limitation of the present invention. In various embodiments, test system 100 may be used to determine characteristics of one or more individual LEEs 142, portions of arrays of sample 140, an entire array of sample 140 or multiple arrays of samples 140. Examples of array-level characteristics that may be determined include but are not limited to:

X, Y, Z—the CIE 1931 tristimulus values of the sample's light output x, y—unitless, the CIE 1931 chromaticity of the sample's light output u, v—unitless, the CIE 1960 chromaticity of the sample's light output u', v'—unitless, the CIE 1976 chromaticity of the sample's light output Luminous flux—lumens, the total light output of the sample Radiant flux—watts, the total light output of the sample Spectral power density of the sample's light output Peak wavelength of the sample's light output Dominant wavelength of the sample's light output CCT—Kelvin, the color temperature of the entire sample Duv—unitless, the sample's distance above or below the Planckian locus in uv space Power—Watts, the power drawn by the sample under operation Voltage—Volts, the voltage applied to the sample under operation Current—milliamps, the current delivered to the sample under operation Efficacy—lumens/Watt, the light output per power input CRI—unitless, the color rendering index of the sample's light output R9—unitless, the strong red rendering index of the sample's light output CQS—unitless, the color quality scale score of the sample's light output GAI—unitless, the gamut area index of the sample's light output FSCI—unitless, the full spectrum index of the sample's light output SDCM-to-Target—SDCM, the sample's distance in chromaticity space from the chromaticity target in standard deviations of color matching (MacAdam Ellipses)

$\Delta u'v'$-to-Target—unitless, the sample's distance in chromaticity space from the chromaticity target in u'v' space $\Delta u'v'$ to average of other arrays or samples (to determine array-to-array or sample-to-sample variation)

Angular color uniformity—for example CCT variation as a function of view angle.

Spatial luminous flux intensity and uniformity

Spatial radiant flux intensity and uniformity

Examples of LEE-level characteristics that may be determined include but are not limited to:

X, Y, Z—the CIE 1931 tristimulus values of each LEE's light output x, y—unitless, the CIE 1931 chromaticity of each LEE's light output u, v—unitless, the CIE 1960 chromaticity of each LEE's light output u', v'—unitless, the CIE 1976 chromaticity of each LEE's light output Flux—lumens, the total light output of each LEE Luminous flux—lumens, the total light output of each LEE Radiant flux—watts, the total light output of each LEE Spectral power density of each LEE's light output Peak wavelength of each LEE's light output Dominant wavelength of each LEE's light output CCT—Kelvin, the color temperature of each LEE Duv—unitless, the LEE's distance above or below the Planckian locus in uv space Brightness uniformity—percentage, the percentage that each LEE is greater or less than the average brightness of LEEs SDCM-to-Sheet—SDCM, the distance of each LEE's chromaticity to the sample's chromaticity $\Delta u'v'$-to-Sheet—unitless, the chromaticity distance in u'v' space between each LEE's chromaticity and the sample's chromaticity CCT-to-Sheet—Kelvin, the difference between each LEE's CCT and the sample's CCT Duv-to-Sheet—unitless, the difference between each LEE's Duv and the sample's Duv SDCM-to-Target—SDCM, the distance of each LEE's chromaticity to the chromaticity target $\Delta u'v'$-to-Target—unitless, the chromaticity distance in u'v' between each LEE's chromaticity and the chromaticity target CCT-to-Target—Kelvin, the difference between each LEE's CCT and the CCT of the chromaticity Target Duv-to-Target—unitless, the difference between each LEE's Duv and the Duv of the chromaticity target Angular color uniformity—for example CCT variation as a function of view angle Spatial luminous flux intensity and uniformity Spatial radiant flux intensity and uniformity Physical location of an LEE relative to another LEE or LEEs or to a fiducial mark on the light-emitting device or to one or more coordinates corresponding to positions on the light-emitting device In various embodiments of the present invention, one or more images of the sample or array may be analyzed to determine a number of geometrical characteristics. For example, the number of LEEs 142 in an array and the spacing between adjacent LEEs 142 may be determined from the image. In embodiments in which the individual LEEs are in a regular periodic array, or where their positions are known in advance, this also permits a determination of non-functioning or malfunctioning (non-light-emitting) LEEs 142, for example where a LEE is shorted or open or not emitting the correct light intensity (for example too dim or too bright). In embodiments in which LEEs 142 are not in a regular periodic array, the total number of and the locations of each light-emitting LEEs 142 may be determined; however, in various embodiments of the present invention, non-light-emitting LEEs 142 may not be identified using only analysis of the image. In various embodiments of the present invention, additional information about the array may be used in the analysis of the array, for example the number of LEEs 142 in the array, the spacing between LEEs 142, a map locating the position of some or all LEEs 142 in the array, or the like.

Figure 3:
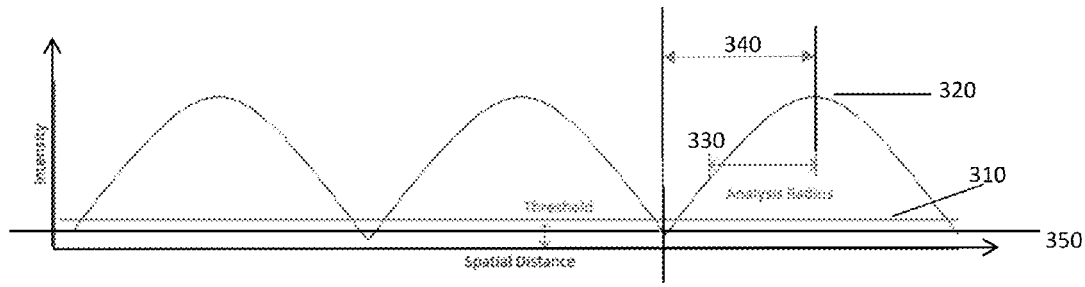
FIGS. 3 and 4A and 4B are schematic illustrations of test results in accordance with various embodiments of the invention.

FIG. 3 shows an example schematic of an intensity vs. spatial distance plot or profile in one dimension, for example through a portion of cut line A-A' of FIG. 2B, as determined by imaging system 120. In various embodiments, the system uses a threshold level 310 to distinguish between adjacent LEEs. In various embodiments, adjacent LEEs may be each spatially located by identification of a peak intensity 320, which identifies the center of the LEE, and a reduction in the light intensity around each LEE to below the threshold value 310, which may indicate the boundary between two adjacent LEEs 142. In various embodiments of the present invention, the system analyzes the data within an analysis radius 330 around the peak intensity 320. In various embodiments, analysis radius 330 is smaller than the image radius 340 as determined by a minimum intensity level 350 between adjacent LEEs. FIG. 3 shows analysis radius 330 as being smaller than image radius 340; however, this is not a limitation of the present invention, and in other embodiments image radius 340 may be equal to or larger than analysis radius 330.

Figure 4A:
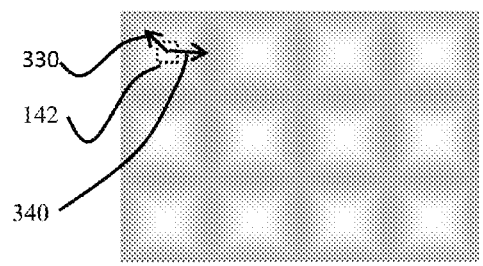
Figure 4B:
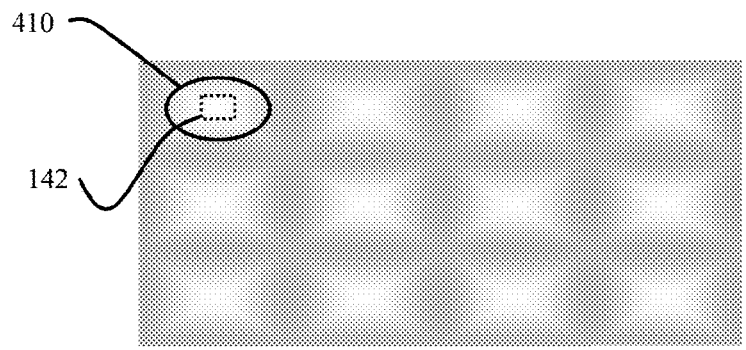

The actual image of each LEE 142 may have any of a variety of shapes. For example, FIG. 4A shows a greyscale schematic of an intensity image, similar to that of FIG. 2B. Also shown in FIG. 4A is an outline of an LEE 142 and arrows indicating the analysis radius 330 and image radius 340. In other embodiments, the intensity image may not be circularly symmetric and thus the analysis area and image area may have different shapes and may not be defined by a radius or only by a radius (e.g., they may be defined by two or more lateral dimensions). For example, FIG. 4B shows an image similar to that of FIG. 4A; however, in FIG. 4B the image is relatively or substantially ellipsoidal, represented by an ellipse 410. In various embodiments of the present invention, LEE 142 may have a rectangular shape, which may lead to an ellipsoidal image, such as that shown in FIG. 4B. While FIG. 4B shows an ellipsoidal area, this is not a limitation of the present invention, and in other embodiments the image area may have any shape.

In various embodiments of the present invention, the image area may be defined by a region bounded by the minimum intensity level 350, which in some embodiments may have a square shape, a round shape, an ellipsoidal shape, or any arbitrary shape. In various embodiments of the present invention in which the sample incorporates a non-periodic array of LEEs 142, the image area and analysis area may be different for different LEEs 142.

In various embodiments of the present invention, the spacing of the individual LEEs and the sensitivity and resolution of the imaging system are such to provide sufficient differentiation between adjacent LEEs 142. In various embodiments of the present invention, the positions of LEEs 142 are known in advance, while in other embodiments the positions of LEEs 142 are not known in advance of making the measurement.

In various embodiments of the present invention, threshold value 310 is set to a level that reliably provides differentiation between adjacent LEEs 142. In various embodiments of the present invention, threshold value 310 is at most 75% of peak intensity 320. In various embodiments of the present invention, threshold value 310 is at most 50% of peak intensity 320. In various embodiments of the present invention, threshold value 310 is at most 25% of peak intensity 320. In various embodiments of the present invention, threshold value 310 is at most 10% of peak intensity 320. In various embodiments of the present invention, threshold value 310 is at most 5% of peak intensity 320.

In various embodiments of the present invention, analysis radius 330 is the same as or substantially the same as image radius 340. In various embodiments of the present invention, analysis radius 330 is at most 90% of image radius 340. In various embodiments of the present invention, analysis radius 330 is at most 50% of image radius 340. In various embodiments of the present invention, analysis radius 330 is at most 25% of image radius 340. In various embodiments of the present invention, analysis radius 330 is at most 125% of image radius 340; however, analysis radius 330 or area is not a limitation of the present invention, and any analysis radius may be used. Independent of how the analysis area is determined, for example by a fixed value as identified by analysis radius 330 in FIG. 3 or by the intensity decreasing to a threshold 310, also shown in FIG. 3, the pixels within the analysis area are analyzed to determine one or more optical characteristics of each LEE 142.

The number of pixels per unit length, or pixel density, is another important parameter of imaging system 120, as it in part determines the spatial resolution of the system in accordance with various embodiments of the present invention. As discussed above, in various embodiments the length of the region in the x-direction represented by one pixel may be given approximately by a/m, where a is the length of viewing area 130 and m is the number of pixels in the imaging system in that direction. The pixel size relative to the imaging resolution may be determined by dividing the viewing area dimension by the pixel size in a particular direction. In various embodiments, for a viewing area 130 of about 12" by about 24" and an imaging system having an array of 1024×1536 pixels, each pixel in the short dimension represents 12"/1024 or about 0.012" (about 0.298 mm), and each pixel in the long dimension represents 24"/1536 or about 0.016" (about 0.397 mm). In various embodiments, a viewing area 130 of about 12" by about 24" and an imaging system having an array of 2056×3072 pixels, each pixel in the short dimension represents 12"/2056 or about 0.0058" (about 0.148 mm) and each pixel in the long dimension represents 24"/3072 or about 0.0078" (about 0.198 mm).

In various embodiments of the present invention, the number of pixels per LEE 142 may be determined by the required resolution and capability of the system. If the number of pixels per LEE 142 is very low, it may result in an inability to sufficiently distinguish adjacent LEEs 142. Referring to FIG. 3, it may be seen that a sufficiently large number of pixels may be required to set parameters such as analysis radius 330, image radius 340, peak intensity 320, and threshold value 310. A larger pixel density aids in achieving a low minimum intensity level 350. Alternatively, the resolution, for example the number of pixels per LEE, may be determined from the camera and system geometry, or the minimum desired pitch may be determined in a similar fashion. In various embodiments of the present invention, the minimum number of pixels per LEE 142 may be determined by the required color measurement repeatability given the imaging system's color capability. For example, the G2 Radiant Vision Systems imaging colorimeter has approximately a 0.0006 CIE xy variation averaging over 100 pixels.

In various embodiments of the present invention, the spacing between LEEs 142 is no less than about five (5) times the pixel size, for example no less than about 5×(min [a/m or b/n]), in other words no less than about 5 times the smaller of a/m or b/n, where a/m or b/n represent the pixel dimension in a particular direction. This provides a square or rectangle at least 5 pixels on a side for resolving each LEE. In this example, the array of pixels in imaging system 120 is assumed to have a rectangular or square orientation, with the same distance between each pixel in both the x and y directions; however, this is not a limitation of the present invention, and in other embodiments the imaged area of image system 120 may have other geometries. In various embodiments of the present invention, the spacing between LEEs 142 is no less than about ten (10) times the pixel size, or no less than about 10×(min[a/m or b/n]), or no less than about twelve (12) times the pixel size or no less than about 12×(min[a/m or b/n]), or no less than about twenty (20) times the pixel size or no less than about 20×(min[a/m or b/n]). In various embodiments of the present invention, the number of pixels per LEE 142 is no less than about 1000, or no less than about 500, or no less than about 250, or no less than about 100, or no less than about 50, or no less than about 25, or no less than about 5.

Figure 5A:
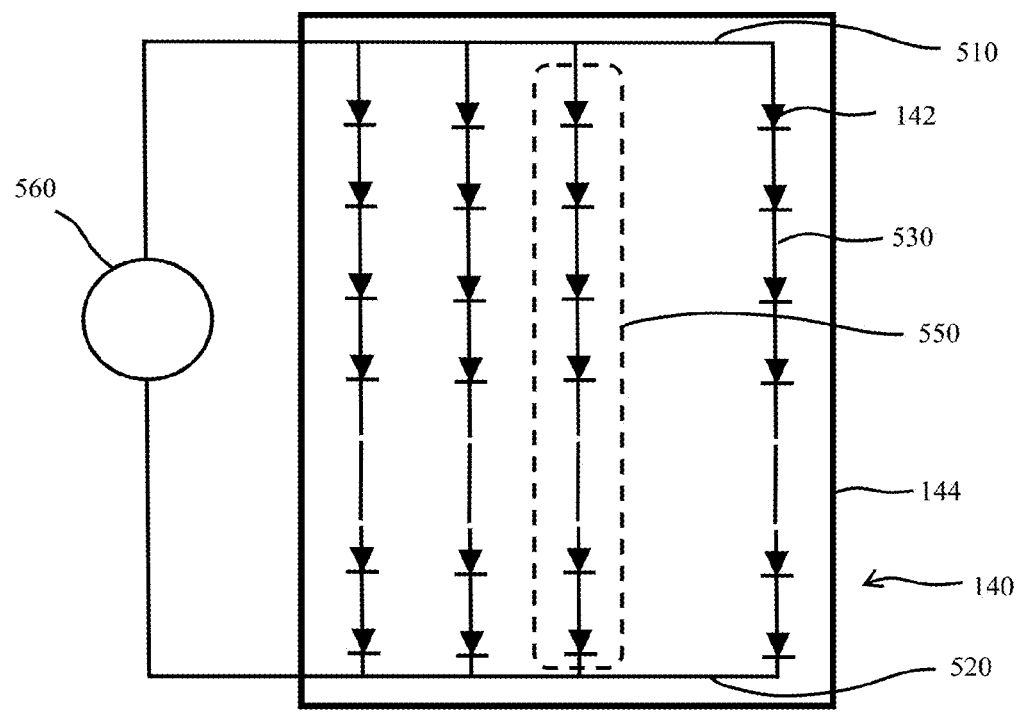
FIGS. 5A-5C are schematic illustrations of test structures in accordance with various embodiments of the invention.

In various embodiments of the present invention, one or more electrical characteristics of the sample may also be measured. For example, in various embodiments of the present invention, the sample may be energized using a current source and the resulting voltage may be measured, or the sample may be energized using a voltage source and the resulting current may be measured. In various embodiments of the present invention, the sample may be energized using a constant energization source or the energization source may be varied or pulsed. In various embodiments of the present invention, the sample may include or consist essentially of an array of LEEs 142 configured as series-coupled strings of LEEs 142 that are electrically coupled in parallel, for example as shown in FIG. 5A. In various embodiments of the present invention sample or light sheet 140 may include substrate 144 on which is disposed power conductors 510 and 520, with light-emitting strings 550 electrically coupled between power conductors 510 and 520. One or more LEEs 142 are electrically coupled within light-emitting strings 550. While FIG. 5A shows LEEs 142 electrically coupled in series within light-emitting string 550; this is not a limitation of the present invention, and in other embodiments other electrical configurations, for example parallel or series/parallel or any arbitrary configuration may be used. In various embodiments of the present invention, light sheet 140 is powered by a power source 560 through power conductors 510 and 520. In various embodiments of the present invention, power source 560 may include or consist essentially of a current source, and the voltage generated across light sheet 140 by current source 560 may be measured, for example at one current value or over a range of current values. In various embodiments of the present invention, power source 560 may include or consist essentially of a voltage source, and the current flowing to light sheet 140 by voltage source 560 may be measured, for example at one voltage value or over a range of voltage values. While the schematic of FIG. 5A shows one array of LEEs 142 on sample 140, this is not a limitation of the present invention, and in other embodiments sample 140 may include or consist essentially of more than one array of LEEs 142, and in various embodiments multiple arrays of LEEs 142 may be energized individually or in groups, as described herein. In various embodiments of the present invention, additional electrical contact points may be defined between LEEs 142 to measure one or more electrical characteristics within one or more portions of the array, for example the voltage drop across one or more LEEs 142.

Figure 5B:
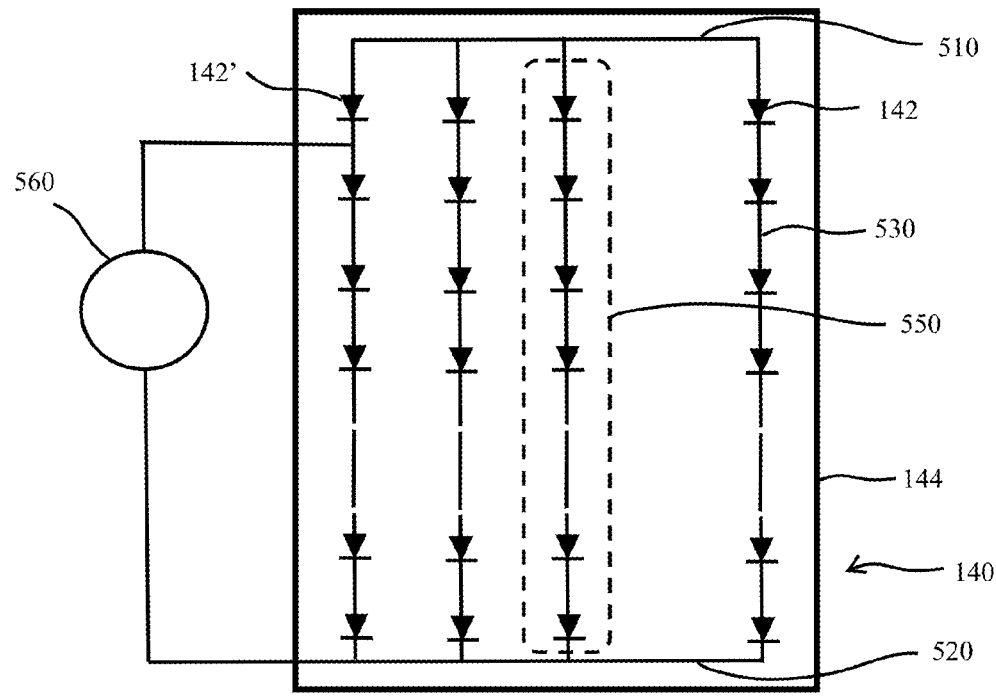

In various embodiments of the present invention, one or more portions of an array may be energized and tested separately. For example, FIG. 5B shows a schematic of power source 560 configured to test a portion of one string 550. In such embodiments, LEE 142' is a light-emitting diode (LED) or other non-linear element and blocks the flow of electricity to power conductor 510. This approach may be utilized in large arrays, for example which are too large to be energized and imaged simultaneously. For example, in a roll-to-roll system, the entire roll or web or an electrically continuous portion of a sample may be too large to be energized and/or too large to fit within imaging area 130. In such embodiments, one or more portions of the web may be energized and analyzed, for example using the approaches described in reference to FIGS. 5B and 5C.

Figure 5C:
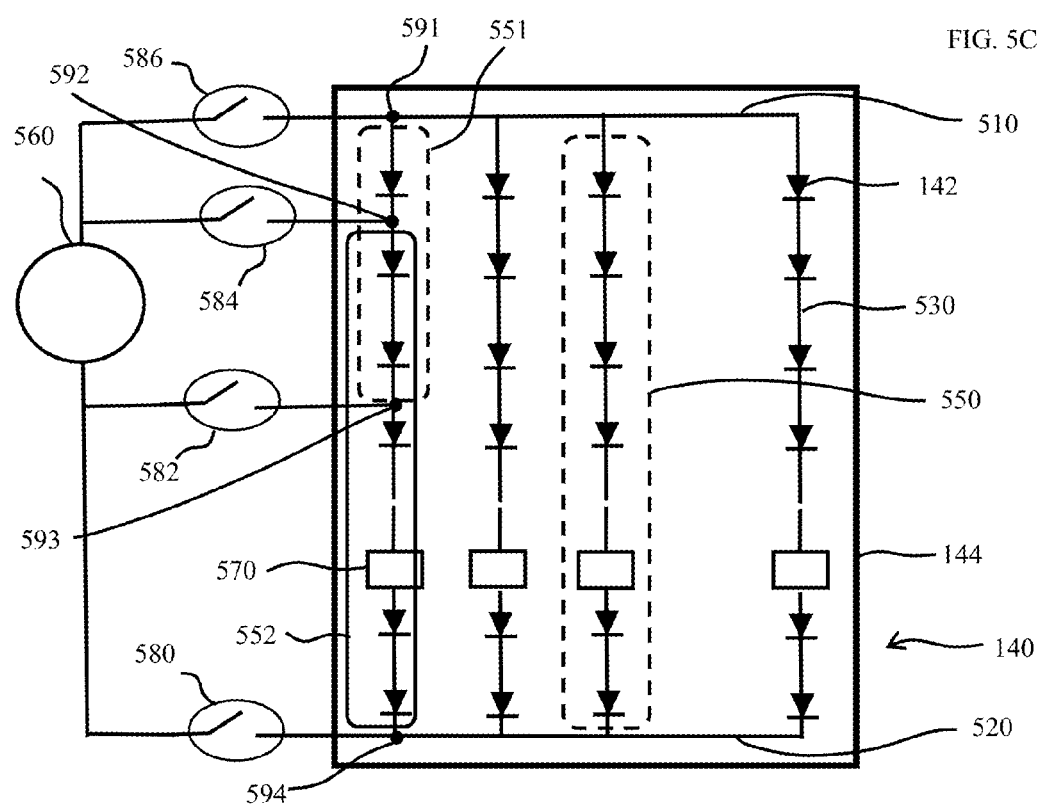

FIG. 5C shows another embodiment of the present invention in which power source 560 is connected, for example temporarily, to several positions along a string 550. In the example of FIG. 5C, power source 560 is connected to the string through four switches 580, 582, 584, and 586. In various embodiments of the present invention, switches 586 and 582 may be closed and switches 584 and 580 may be open, permitting energizing of a portion 551 of the string. Alternatively switches 586 and 582 may be opened and switches 584 and 580 may be closed, permitting energizing of a portion 552 of the string. In this fashion all of the elements in a string may be characterized, while being isolated from other strings that are electrically coupled to the common power conductors 510 and 520. In various embodiments of the present invention, power source 560 may include or consist essentially of a current source, and LEEs 142 may include or consist essentially of LEDs. In such embodiments, the current source may be set to a fixed current value or the current may be varied, for example in a step-wise, pulsed, arbitrary or continuous fashion, and in some embodiments a separate image may be formed at each current level. In various embodiments of the present invention, power source 560 may include or consist essentially of a voltage source, and LEEs 142 may include or consist essentially of LEDs. In such embodiments, the voltage source may be set to a fixed current value or the voltage may be varied, for example in a step-wise, pulsed, arbitrary or continuous fashion, and in some embodiments a separate image may be formed at each voltage level.

While FIG. 5C shows the two different electrical configurations overlapping, i.e., two LEEs 142 being energized twice, this is not a limitation of the present invention, and in other embodiments none, one, or more than two LEEs 142 may be energized multiple times during testing of a sample or array. While FIG. 5C shows two string portions 551 and 552, this is not a limitation of the present invention, and in other embodiments more than two portions of a string may be defined and utilized for testing.

In various embodiments of the present invention, one or more strings 550 may include an optional current control element 570, as shown in FIG. 5C. In various embodiments of the present invention, current control element 570 may act to control, regulate or set the current in string 550, for example as described in U.S. patent application Ser. No. 13/799,807, filed on Mar. 13, 2013, and U.S. patent application Ser. No. 13/970,027, filed on Aug. 19, 2013, the entire disclosure of each of which is hereby incorporated by reference. In various embodiments, a constant voltage may be applied across power conductors 510 and 520 and current control element 570 may act to control, regulate, or set the current in string 550. In various embodiments of the present invention, power supply 560 may include or consist essentially of a voltage source, for example as applied to a string or string portion including current control element 570, for example string portion 552 in FIG. 5C. In such embodiments, current control element 570 may act to control the current in string portion 552 to the desired value for testing purposes.

In various embodiments of the present invention, the voltage applied to a string portion including a current control element may be different from that applied between power conductors 510 and 520 during normal operation of the sample or array. For example, in various embodiments of the present invention, the voltage applied to a portion of a string may be less than that applied during normal operation, for example less by about the forward voltage drop across the elements, for example LEEs 142, not included in string portion 552.

In various embodiments of the present invention, switches 580, 582, 584, and 586 may be manually operated, while in other embodiments they may be operated automatically, for example under control of a test system or test computer. In various embodiments of the present invention, switches 580, 582, 584, and 586 may each include or consist essentially of a relay, for example an electro-mechanical relay, a solid-state relay, a semiconductor switch, or the like. Using this approach a sample may be fully tested, even when the sample is too large to be fully energized or imaged simultaneously (in one image). In various embodiments of the present invention, sample 140 includes or consists essentially of the LEE array shown in FIG. 5C, including current control elements 570, and each string 550 is tested by applying a voltage or a constant or substantially constant voltage through switches 584 and 580 to test string portion 552 and by applying a current or a constant or substantially constant current through switches 586 and 582 to test string portion 551. In various embodiments of the present invention, the string portions may be divided in various ways, for example instead of dividing into string portions 551 and 552, the string could be divided into two portions on either side of current control element 570, such that each portion, when tested, includes current control element 570. The specific division of a string into two or more portions is not a limitation of the present invention.

In various embodiments of the present invention, each string or portion of a string may be tested individually. In various embodiments of the present invention, multiple strings or portions of multiple strings may be simultaneously energized and evaluated optically and/or electrically. In various embodiments of the present invention, various electrical parameters on a string or sub-string basis, for example string voltage, voltage across the current control element, voltage across multiple or single LEEs may also be determined.

In various embodiments of the present invention, LEEs 142 may be energized for a period of time before being imaged by camera 120, for example to permit LEEs 142 to heat or to thermally stabilize or to substantially thermally stabilize or to reach a certain temperature. In various embodiments of the present invention, the energization time prior to imaging may be in the range of about 0.1 seconds to about 60 seconds. In various embodiments of the present invention, the energization current may be different from the test current. For example, in various embodiments of the present invention, LEEs 142 may be energized at a higher current or voltage or power than that used for the measurement, for example to minimize the temperature stabilization time and potentially increase the throughput. In various embodiments of the present invention, a specific current or voltage or power profile may be used (for example a specific variable current, voltage or power as a function of time) to pre-condition LEEs 142 before measurement, for example to increase throughput. In various embodiments of the present invention, LEEs 142 are energized prior to being positioned within viewing area 130, for example to permit heating or thermal stabilization of a sample or portion of a sample prior to imaging, for example to increase throughput of the test system.

In various embodiments of the present invention, a probe card or similar apparatus may be used to electrically contact the conductive traces on the test sample. For example in FIG. 5C, string 551 is electrically contacted at four points, identified as 591, 592, 593, and 594; however, this is not a limitation of the present invention, and in other embodiments string 551 may be contacted at fewer points or at a larger number of points. While FIG. 5C shows only one string 551 being contacted, this is not a limitation of the present invention, and in other embodiments more than one string may be contacted simultaneously. For example, in various embodiments of the present invention 10 strings or 20 strings or any arbitrary number of strings or partial strings may be contacted and energized simultaneously or in a timed sequence. In various embodiments of the present invention in which sample 140 is larger than viewing area 130, all of the strings in viewing area 130 may be contacted and energized simultaneously. In various embodiments of the present invention in which sample 140 is larger than viewing area 130, all of the strings in viewing area 130 may be contacted simultaneously and energized in a timed sequence.

In various embodiments of the present invention, the probe card is configured to have relatively small probes that contact the conductive traces, where the probes are small enough that they do not substantially occlude the light and/or do not substantially affect the light received by camera 120. In various embodiments, the probe card includes or consists essentially of a transparent or substantially transparent base on which are mounted, formed, or attached the conductive probes. In various embodiments of the present invention, the transparent base is transparent to a wavelength of light emitted by sample 140. In various embodiments of the present invention, the transparent base may include one or more coatings, for example a reflective coating or an anti-reflection coating. In various embodiments of the present invention, the presence of the probes and/or the transparent base is calibrated out of the measurement. For example, in various embodiments of the present invention, measurements may be made both with and without the probes, either by themselves or with a transparent base (where energization of sample 140 without probes is done in another fashion, for example by attachment of wires that do not occlude or affect the light emitted by sample 140), and the difference in the measurements may be used to provide a correction factor when the probes or probe card or transparent base is used. In various embodiments of the present invention, the transparent base may have a transmittance greater than about 70% for a wavelength of light emitted by sample 140. In various embodiments of the present invention, the transmittance of the transparent base may be a function of wavelength and a wavelength-dependent correction factor may be applied when utilizing the transparent base. While the term transparent base has been used in the preceding discussion, other forms are within the spirit of the present invention, for example bases than have only a portion that is transparent, a transparent support or the like.

Figure 5D:
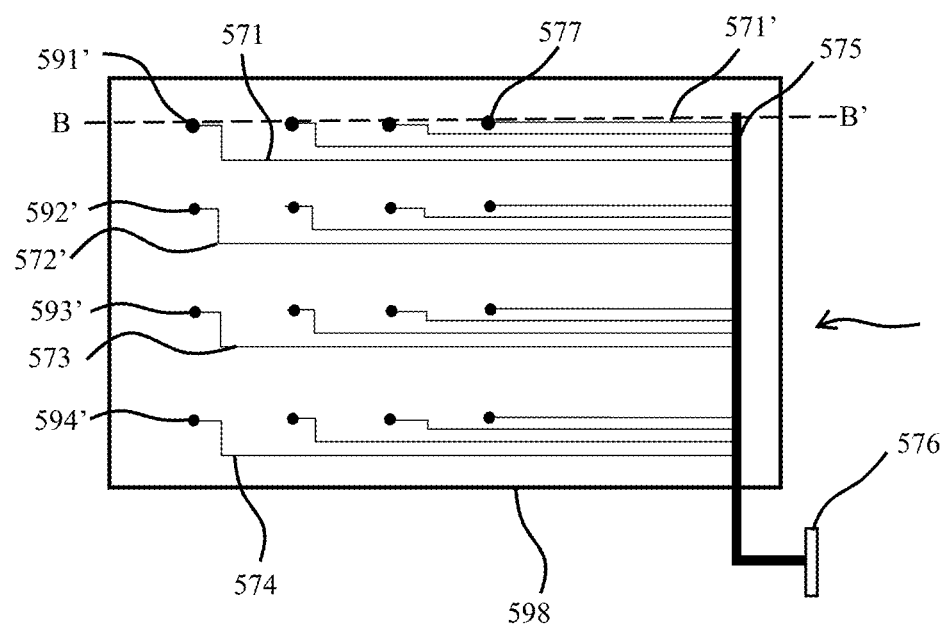
FIGS. 5D and 5E are a plan view and a cross-sectional view, respectively, of a probe card usable in various embodiments of the invention.

FIG. 5D shows a plan view of one embodiment of a probe card 599. In various embodiments of the present invention, probe card 599 includes or consists essentially of a transparent base 598 and probes 577 disposed thereon or therein. Each probe 577 is electrically coupled to a conductive element 571', which in some embodiments of the present invention may be bundled together into a cable or harness 575 to which is optionally attached a connector 576. In various embodiments of the present invention, connector 576 is attached to a part of test system 100, for example to provide power, for example current and voltage, to energize sample 140 or to SMU 182 (FIG. 1). In various embodiments of the present invention, probes 591', 592', 593', and 594' in FIG. 5D are electrically coupled to points 591, 592, 593, and 594 on sample 140 in FIG. 5C, for example to carry out one or more tests. In various embodiments of the present invention, base 598 may not be transparent. In various embodiments of the present invention, base 598 may define one or more holes therethrough, for example through-holes, which may be positioned to pass light from sample 140 to the imaging system.

Figure 5E:
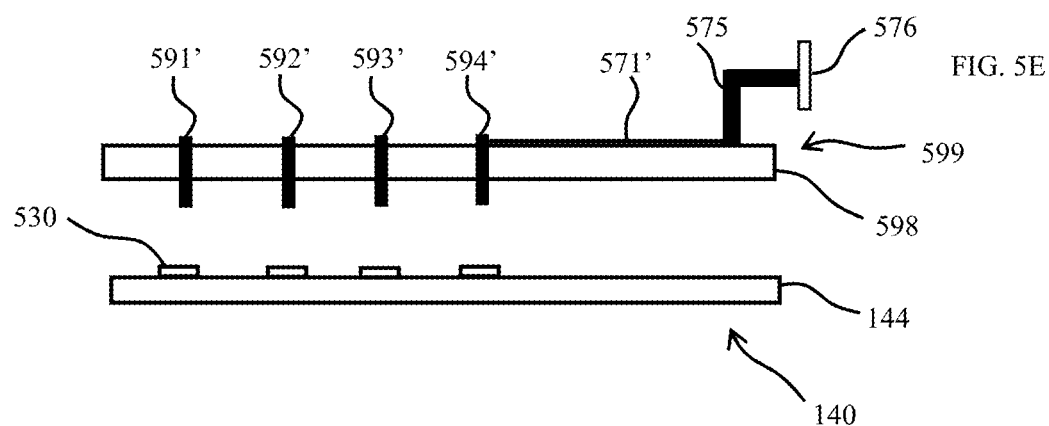

FIG. 5E shows a cross-sectional view of probe card 599 of FIG. 5D through cut line B-B' and positioned above an exemplary sample 140. Probe card 599 includes base 598 and probes 591', 592', 593', and 594'. In this example, probes 591', 592', 593', and 594' extend through base 598; however, this is not a limitation of the present invention, and in other embodiments probes 591', 592', 593', and 594' may be disposed on the bottom of base 598 or may all extend through a hole in base 598 or may be positioned in another fashion. In this example, probe 594' is electrically coupled to cable or harness 575 by conductive element 571' (the other probes are also electrically coupled to cable 575, but these connections are not shown in FIG. 5E for clarity); however, this is not a limitation of the present invention, and in other embodiments wires or conductive elements connecting the probes to the test system may have different configurations. For example, such elements may include or consist essentially of separate wires, shielded wires, or the like. As may be seen in FIG. 5E, probes 591', 592', 593', and 594' are positioned above conductive elements 530 on substrate 144 and are positioned to contact specific positions in the electrical circuitry of sample 140 that are appropriate for the desired test. In various embodiments of the present invention, a mechanism (e.g., a stepper motor, solenoid, or the like; not shown in FIG. 5E) is included to raise and lower structure 599 relative to sample 140, to permit contact to sample 140 when desired, and to permit movement of sample 140 or removal of sample 140 from the test area when required, for example when probe card 599 is raised so that it is not in contact with sample 140. In various embodiments of the present invention, sample 140 may be raised or lowered to electrically couple contact probes 591', 592', 593', and 594' to conductive elements 130 or both sample 140 and probe card 599 may be moved to provide and remove contact between contact probes 591', 592', 593', and 594' and conductive elements 130.

In various embodiments of the present invention, base 598 is electrically insulating, while in other embodiments base 598 may be electrically conductive yet electrically isolated from the probes and other conductive elements. In various embodiments of the present invention, base 598 may include or consist essentially of one or more of the following materials: glass, plastic, fiberglass, FR4, aluminum. However, the specific material of base 598 is not a limitation of the present invention. While FIGS. 5D and 5E show a probe card for contacting sample 140, this is not a limitation of the present invention and in other embodiments other means to contact sample 140, for example individual probes, connectors or the like, may be utilized.

There are a number of factors that may determine the imaging system specifications and setup. These factors include but are not limited to: desired light source measurement repeatability, desired measurement duration per array, desired number of partial images per array, desired working distance of the measurement system setup, light source warm-up and/or stabilization time (for example to improve the repeatability of the measurement, for example to permit LEEs 142 to stabilize at their operational temperature), the need to accommodate different densities of LEEs 142 per array, and the need to accommodate different nominal measurement values of individual LEEs 142 per array. These factors affect the requirements of the imaging system and image processing algorithm parameters, including but not limited to: imaging resolution, working distance, lens type (focal distance), adjustable variable focal distance, aperture size (f-number), exposure time (integration time), additional filters (e.g., neutral density filters), algorithmic intensity threshold 310, and analysis radius 330.

Figure 6A:
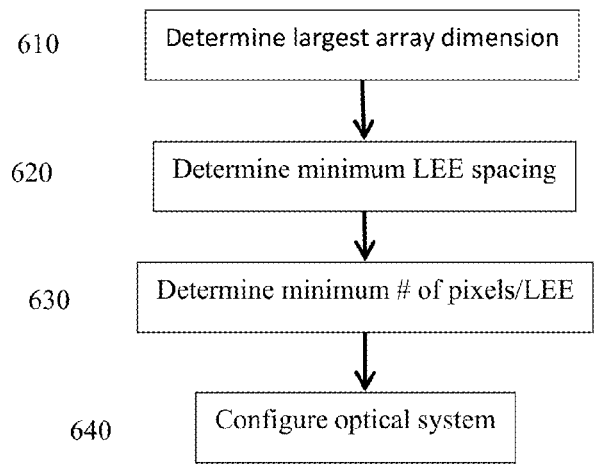
FIG. 6A is a flow chart depicting a process flow for configuring testing systems in accordance with various embodiments of the invention.

FIG. 6 shows a flow chart of a process 600 for configuring an image analysis system of the present invention. Process 600 is shown having four steps; however, this is not a limitation of the present invention, and in other embodiments the invention has more or fewer steps and/or the steps may be performed in different order. In step 610, the maximum array size to be measured is determined. In step 620, the minimum spacing between LEEs 142 is determined. In step 630, the minimum number of pixels per LEE is determined. In step 640, the optical system is configured at least in part using the information gathered in steps 610, 620, and 630.

Example 1

Table 1 lists a summary of parameters of a camera-based test system embodiment of the present invention that may be used to configure a lighting system including or consisting essentially of an array of LEEs. Using steps of the general process depicted in FIG. 6, but in a different order, the minimum LEE spacing is determined as follows. In step 610 the maximum array dimension is determined. In this example, the array dimension is about 35 cm by about 70 cm. Per Table 1, the sensor has 1536 pixels in one direction (identified as the x-direction) and 1024 pixels in the y-direction. Dividing these by 70 and 35 cm respectively gives about 0.46 mm/pixel and about 0.34 mm/pixel in the x and y directions respectively. In step 630 the minimum number of pixels/LEE is determined. In this example, the minimum number of pixels/LEE in each direction is determined to be about 12, for a total number of pixels per LEE of about 144. In step 620 the minimum LEE spacing is determined by multiplying the minimum number of pixels/LEE in each direction by the imaged size per pixel. In this example the minimum LEE spacing in the x-direction is about 5.5 mm while in the y-direction the minimum LEE spacing is about 4.1 mm.

The calculation described above for the number of pixels per LEE applies to an image of the LEE that is in focus or substantially in focus on the sensor or camera, for example on image sensor 125. In various embodiments of the present invention, the image may be intentionally defocused to modify the number of pixels per LEE, for example to either increase the number or decrease the number relative to the in-focus image. For example, in various embodiments of the present invention, increasing the number of pixels per LEE by defocusing the image may result in an effectively higher number of pixels per LEE and thus an improved spatial resolution.

Figures 6B, 6C:
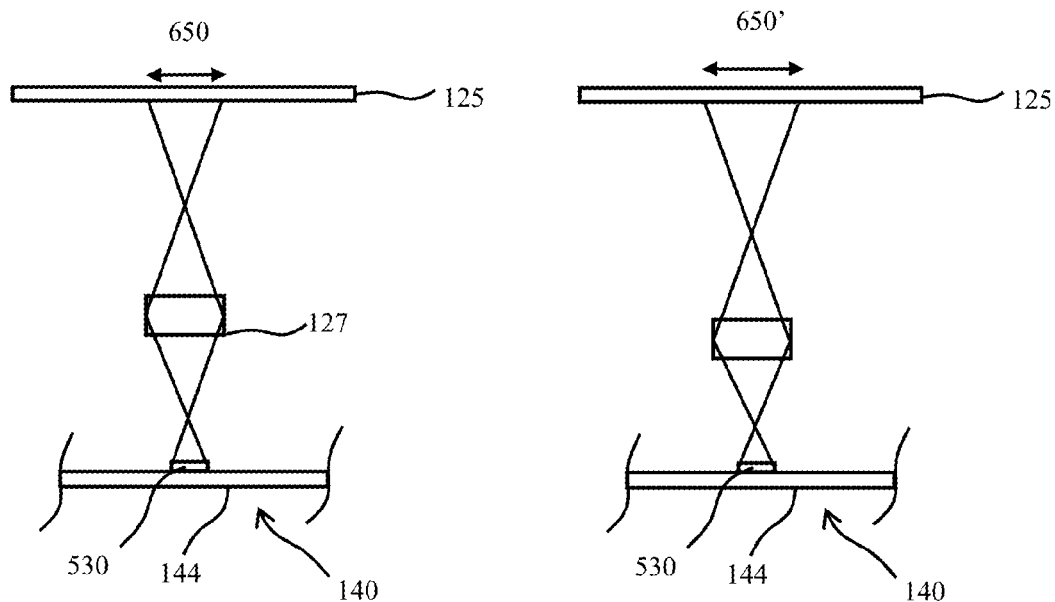
FIG. 6B is a schematic illustration of an image of a test sample focused onto a detector in accordance with various embodiments of the invention.
FIG. 6C is a schematic illustration of an image of a test sample defocused in relation to a detector in accordance with various embodiments of the invention.

FIG. 6B shows a schematic of an imaging system in which an image 650 of LEE 530 is in focus or substantially in focus on image sensor 125. FIG. 6C shows a schematic of an imaging system in which an image 650' of LEE 530 has been defocused on image sensor 125. In this example, the defocused image 650' is larger than the in-focus image 650, resulting in a higher spatial resolution, that is a larger number of pixels on the sensor for a fixed image area. However, in other embodiments the defocused image may be smaller than the in-focus image.

In various embodiments of the present invention, one or more other factors, either individually or in combination, for example one or more lenses or optical elements (including their characteristics such as focal distance, f-stop number, exposure times, or the like) and working distance 160 may further modify the number of pixels per LEE. For example, with a sensor of about 1536 by 1024 pixels, a focal distance of about 0.75 m, a working distance of about 0.75 m, a 20 mm lens, exposure times of 203, 524, 1147, and 1196 ms for X, Xb, Y, and Z respectively, ND3 filters, and an f-stop of about 8, the number of pixels per LEE is about 96. Xb is an optional fourth tristimulus value which may be utilized for increased color accuracy.

The minimum number of pixels per LEE in this example is exemplary, and other embodiments of the present invention may have different values depending on the specific systems utilized. The minimum number of pixels per LEE may be defined in several ways, depending on the needs of the system and application. For example, in some embodiments of the present invention, the minimum number of pixels per LEE is a linear measure, for example as discussed herein, there may be a different minimum number of pixels in orthogonal directions. In various embodiments, the minimum number of pixels per LEE may be an area measure, for example an LEE (or its emission area) has dimensions that may be represented in pixel size, and thus the minimum number of pixels is the number of square pixels represented by the LEE. For example an LEE in a 3014 package has an emission area or plane of about 2.4×1.1 mm. Using the pixel size of about 0.46 mm/pixel and about 0.34 mm/pixel in the x and y directions respectively, with the LEE having the long axis in the x-direction, the number of linear pixels in the x- and y-directions are 2.4 mm/0.45 mm/pixel=5.3 pixels and 1.1 mm/0.34 mm/pixel=3.2 pixels, resulting in about 5.3× 3.2=17 square pixels per LEE.

Referring to FIG. 1A, in this example the lens 127 is a 20 mm f8 lens which includes a ND3 neutral density filter. In this example, camera 120 is a Radiant Vision Systems G2 imaging colorimeter, which determines the color point of the object to be imaged from three tristimulus values. In this approach, the analysis process starts by taking one or more images of sample 140, for example an array of LEEs 142. In this example the imaging colorimeter takes three pictures, each through a different filter. Each image includes a greyscale value at each pixel. In various embodiments of the present invention, the exposure times for each exposure are the same while in other embodiments they are different. In this example, the exposure times are listed in Table 1. An optional fourth tristimulus value Xb may be utilized for increased color accuracy, as shown in Table 1. In other embodiments, the exposure times may all be the same. In various embodiments of the present invention, the exposure times may range from about 25 milliseconds to about 30 seconds. In this example, the same neutral density filter is used for the three different tristimulus exposures; however, this is not a limitation of the present invention, and in other embodiments a different neutral density filter may be used for the different tristimulus exposures. In this example each tristimulus exposure time has a different value, as shown in Table 1; however, this is not a limitation of the present invention, and in other embodiments all or two of the tristimulus exposure times may be the same.

TABLE 1

| Parameter | Value |
|---|---|
| Camera | Radiant Vision Systems G2 imaging colorimeter |
| Sensor | CCD sensor with 1536 × 1024 pixel array |
| Lens | 20 mm |
| Working distance | 0.75 m |
| Focal distance | 0.75 m |
| Imaging area | 35 cm × 70 cm |
| Neutral density filter | ND3 for all tristimulus colors XYZ |
| fStop | 8 |
| Exposure times | 203, 524, 1147, and 1196 ms for X, Xb, Y, and Z respectively |

Figure 7:
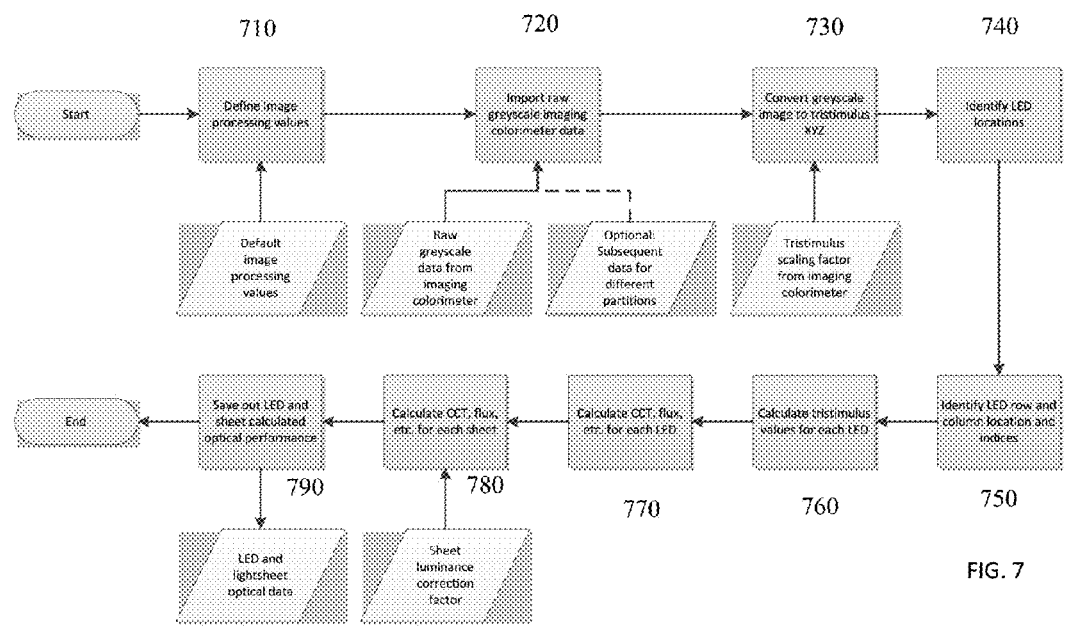
FIG. 7 is a flow chart depicting a process flow for analyzing test results in accordance with various embodiments of the invention.

FIG. 7 shows a flow chart for the method of image processing used in this example, and may be used in various embodiments, after the initial images have been recorded; however, in other embodiments of the present invention the process may include more or fewer or different steps and/or may be performed in a different order. In step 710 the image processing values are defined. These may include a variety of different values, for example intensity threshold value 310, the expected number of pixels per row and column (x and y direction), the expected number of LEEs by row and column, the minimum LEE spacing, the analysis radius per LEE, and other parameters. In various embodiments of the present invention, such parameters are defined initially, while in others only some parameters are defined initially and in other embodiments none are defined initially. In various embodiments of the present invention, some or all of these parameters may be defined as part of the imaging and/or analysis process.

In step 720 the raw greyscale data is imported from the camera after the images have been recorded. In this example, the greyscale intensity value of each pixel for each of the three tristimulus exposures is determined (e.g., imported from the camera). In step 730, the greyscale data is converted into the tristimulus values using tristimulus scaling factors. In this example, the scaling factors are determined from within (by) the camera; however, this is not a limitation of the present invention, and in other embodiments scaling factors may be determined and applied outside of the camera, or may not be utilized. At this point the in the process, each pixel has three values, the three tristimulus values X, Y, and Z. The tristimulus values may be used to calculate other representations of the color point, for example CIE 1931 xy (as defined by the International Commission on Illumination (CIE) in 1931 (CIE (1932), Commission internationale de l'Eclairage proceedings, 1931, Cambridge: Cambridge University Press, the entirety of which is incorporated herein by reference) or CIE 1976 u'v' (as defined by the International Commission on Illumination (CIE) in 1976 (*Colorimetry*, second edition: CIE publication 15.2, Vienna: Bureau Central CIE, 1986, the entirety of which is incorporated herein by reference). The CIE 1931 xy is calculated from the tristimulus XYZ as follows:

$$x = \frac{X}{X+Y+Z}$$
$$y = \frac{Y}{X+Y+Z}$$

The CIE 1976 u'v' is calculated from the tristimulus XYZ as follows:

$$u' = \frac{4X}{X+15Y+3Z}$$
$$v' = \frac{9Y}{X+15Y+3Z}$$

In step 740 the LEEs' locations are identified. In various embodiments of the present invention, the locations may be pre-identified, for example as part of the image processing variables defined in step 710, for example from a coordinate listing of each LEE, from a design file, for example a computer aided design (CAD) file, from a golden sample measurement, or the like; however, this is not a limitation of the present invention, and in other embodiments, for example as described in this example, the LEE locations are determined by analysis of the image. A variety of analysis (e.g., image-processing, image recognition) techniques may be utilized to determine the LEE locations, and if desired, to separate the LEEs from the background and/or from each other, and the method to do so is not a limitation of the present invention. For example, in various embodiments a threshold value, for example which may be part of the image processing variables defined in step 710, may be compared to the value of each pixel—if the pixel value is greater than the threshold the pixel is defined to be part of a LEE, while if the pixel value is less than the threshold the pixel is not part of a LEE. In this example, the pixels are then evaluated to determine the value of all neighboring pixels to form connected regions, each consisting of pixels having an above-threshold value, where each connected region represents one LEE. In various embodiments of the present invention, other characteristics may be determined. For example, in various embodiments of the present invention the center, centroid, or center of mass of each connected region may be determined, which may be associated with or defined to be the center point of the LEE. In various embodiments of the present invention, the maximum value of the intensity within the connected region may be associated with or defined to be the center point of the LEE. In various embodiments of the present invention, the area or number of pixels of each connected region may be determined. In various embodiments of the present invention, this area or number of pixels per connected region may be compared to a threshold value, for example to ensure that the connected region is large enough to constitute a LEE, or to check whether a connected region may actually represent two or more LEEs or some other image artifact.

In step 750 the position of each LEE is quantified. For example for a square or rectangular array, the row and column position of each LEE may be determined, the spacing between each LEE may be determined, the x-y coordinates of each LEE may be determined or row and column indices may be determined. In various embodiments of the present invention, other approaches or coordinate systems may be used to quantify the position of the LEEs. In various embodiments of the present invention, the centroid or center of mass of each connected region representing one LEE is used to determine the LEE position, for example the row and column indices. In various embodiments of the present invention, one or more reference LEEs are uniquely identified on the substrate within the viewing area. For example, in various embodiments reference LEEs may be identified at the top-left corner, bottom-left corner, top-right corner, and/or bottom-right corner; however, this is not a limitation of the present invention, and in other embodiments different positions or different numbers of reference LEEs may be utilized. For example, a reference LEE at the top-left corner may be universally identified to always have the highest pixel row coordinate index and the lowest pixel column coordinate index in the image compared to all other LEEs. In this example, all other LEE positions are referenced from this reference LEE. In various embodiments of the present invention, the relative positions are compared to a set of golden sample relative positions pre-defined from a golden sample measurement (i.e., the measurement of a reference sample) which has pre-assigned row and column coordinate indices. In various embodiments of the present invention, the assignment of each LEE position on the test samples is identified by identifying it with the closest golden sample LEE position, in other words the position of the LEE under test is identified as the closest position of an LEE on the golden sample. In this example, the LEE row and column indices assignment are matched with the golden sample indices. In various embodiments of the present invention, a maximum threshold distance prevents assignment of LEE positions to incorrect golden sample positions. In other words, in various embodiments the search distance permitted to assign a LEE position on the sample to a LEE position on the golden sample is limited to a maximum value, to prevent incorrect assignment of the sample LEE position to a golden sample LEE position that is not the closes golden sample LEE position. For example, in various embodiments of the present invention, the threshold value may be about half the value of the minimum LEE pitch (the distance between LEEs). In various embodiments, any LEEs not assigned to a golden sample position are labeled "incorrect" as part of the fail criteria. In various embodiments of the present invention, such a system may be used to identify misplaced LEEs.

In step 760 the pixels within each connected region or within an analysis region associated with each connected region or associated with each LEE or center or centroid of an LEE are analyzed to determine the tristimulus values of each LEE.

In step 770 various parameters for each LEE are determined. For example these may include flux, luminous flux, correlated color temperature (CCT), CRI, or the like. In this example, the CCT of each LEE is determined. For example, the CCT may be determined from the CIE 1931 xy values using McCamy's approximation (McCamy, Calvin S. (April 1992), "Correlated color temperature as an explicit function of chromaticity coordinates," Color Research & Application 17 (2): 142-144. doi:10.1002/col.5080170211, plus erratum doi:10.1002/col.5080180222, the entirety of which is herein incorporated by reference), as follows:

$$x_e = 0.325$$
$$y_e = 0.154$$
$$n(x, y) = \frac{x - x_e}{y - y_e}$$
$$CCT(x, y) = -449n^3 + 3525n^2 - 6823.3n + 5520.33$$

In step 780 various parameters for the array of LEEs are determined. Many different characteristics of the sample to be analyzed may be determined using embodiments of the present invention. Table 3 shows a non-exclusive list of parameters for a white-light lighting system. If the sample includes or consists essentially of monochromatic or single color LEEs 142, other appropriate parameters may be determined, as discussed herein. For example, these may include flux, luminous flux, CCT, CRI, or the like.

In various embodiments of the present invention, the array value (i.e., the collective optical characteristic of the LEEs in the viewing area and/or in the image) may be a simple summation of the individual values for each LEE in the viewing area. For example, in various embodiments of the present invention, the array luminous or radiant flux may be calculated by the summation of the luminous or radiant flux of each LEE. The CCT of the array may be determined in various ways. For example, in various embodiments of the present invention, the CCT of the array may be determined from the CCT of each individual LEE. For example, the CCT of the array may be determined by averaging the CCT of each individual LEE. In various embodiments, the CCT of the array may be determined by a weighted average of the CCT of each LEE, for example where the weighting factor is related to the luminous or radiant flux of each LEE, or the spectral power distribution of each LEE or the CCT of each LEE or using other weighting factors. In various embodiments of the present invention, the CCT of the array is determined by first determining the tristimulus values of the array from the tristimulus values of each individual LEE and then converting the array tristimulus values to a CCT, as described herein. For example, in various embodiments of the present invention, the tristimulus values of the array are determined by the average tristimulus value of each individual LEE, or a weighted average, as described herein. In various embodiments of the present invention, the CIE 1931 xy values of the array may be determined using the definition of CIE 1931 xy from the array tristimulus values. The CCT, CRI or the like, may then be determined from the array CIE 1931 xy values using McCamy's approximation, as described herein. Deviations from a target, for example from a target CCT or other targets, as non-exclusively listed in Table 3, may be determined by first determining the target value and then determining the difference between the array value and the target.

TABLE 3

A relative estimation of LEE flux
CIE 1931 xy of LEEs
CIE 1976 u'v' of LEEs
CCT estimation of LEEs
Duv of LEEs
SDCM of LEEs from average LEE chromaticity
Light sheet (or sample) flux, for example luminous flux or radiant flux
Tristimulus XYZ of light sheet
CIE 1931 xy of light sheet
CIE 1976 u'v' of light sheet
CCT of light sheet
Duv of light sheet
SDCM of light sheet from target CCT on locus
SDCM of light sheet from target CIE xy
Δu'v' of light sheet from target CCT on locus
Δu'v' of light sheet from target CIE xy
Physical location of LEEs In various embodiments of the present invention, one or more optional correction factors may be applied to various test system outputs. Such correction factors may be used for a variety of reasons, for example to calibrate the results from imaging system 120 with an external reference, for example the results from an integrating sphere measurement or from a spectroradiometer measurement, or to correct for incomplete thermal stabilization of the test sample, or to provide consistency of measurement between multiple test systems. As discussed herein but not shown in FIG. 7, electrical characteristics of the sample may also be recorded and analyzed as part of the overall analysis process.

In step 790 the determined and/or measured parameters are saved or output, for example to an operator or to another system. In various embodiments, one or more characteristics based on each LEE or the array or light sheet performance may be compared to a threshold value to determine if the sample is suitable for use or not. In the case of LEE-specific data (i.e., data pertaining to one LEE), for example the CCT of each LEE or the flux of each LEE, the data may be associated with a row and column index, defining the position of that LEE on the substrate. In various embodiments of the present invention, this information may optionally be used to repair or re-work the analyzed lighting system, for example to replace an out-of-specification LEE with one that is operating within specification or to remove an out-of-specification portion of the sample. Such repairs may be undertaken in accordance with techniques detailed in, for example, U.S. patent application Ser. No. 13/967,828, filed on Aug. 15, 2013, and/or U.S. patent application Ser. No. 13/183,684, filed on Jul. 15, 2011, the entire disclosure of each of which is incorporated by reference herein. In various embodiments of the present invention, individual LEEs, or regions adjacent to individual LEEs, may be physically marked, for example with ink, to identify out-of-specification or non-functional LEEs.

In various embodiments of the present invention, pass/fail criteria may be evaluated within the test system 100 or externally, based upon the data gathered by the test system 100. Table 4 presents one example of such pass/fail criteria. In various embodiments, pass/fail criteria may apply to both sheet- or array-level and individual LEE characteristics, while in other embodiments pass/fail criteria may apply to only sheet- or array-level characteristics or only to individual LEE characteristics. In various embodiments of the present invention, the pass/fail criteria may be different from that shown in Table 4. For example, in various embodiments of the present invention, the criteria for sheet flux may be with about ±20% or within about ±10% or within about ±5% or within about 2% or within about 1% of a target value or the sheet or array average value. In various embodiments of the present invention, the criteria for sheet CCT may be with about 5 SDCM or within about 3 SDCM or within about 2.5 SDCM or within about 2 SDCM of a target value or the sheet or array average value. SDCM stands for standard deviation color matching, also known as a MacAdam ellipse (see MacAdam, D. L., Visual Sensitivities to Colour Differences in Daylight, J. Opt. Soc. Am. 32, 247, 1942, the entirety of which is incorporated herein by reference). In various embodiments of the present invention, the criteria for CRI may be greater than about 85 or great than about 90 or greater than about 95. In various embodiments of the present invention, the criteria for LEE flux may be with about ±30% or within about ±25% or within about ±20% or within about 10% or within about 5% or within about 2% of a target value or the sheet or array average value. In various embodiments of the present invention, the criteria for LEE CCT may be with about 6 SDCM or within about 5 SDCM or within about 4 SDCM or within about 3 SDCM or within about 2 SDCM of a target value or the sheet or array average value. In various embodiments of the present invention, other criteria may be used for evaluation of the test results, for example spectral power distribution, R9, radiant flux, or the like.

TABLE 4

| Characteristic | Unit | Criteria |
| --- | --- | --- |
| Sheet flux | Lm | Within ±10% of target |
| Sheet CCT | K | Within 3.5 SDCM of target |
| Sheet CRI | | >80 |
| LEE flux | Lm | Within ±25% of sheet flux |
| LEE CCT | K | Within 5 SDCM |

Example 2

Figure 8:
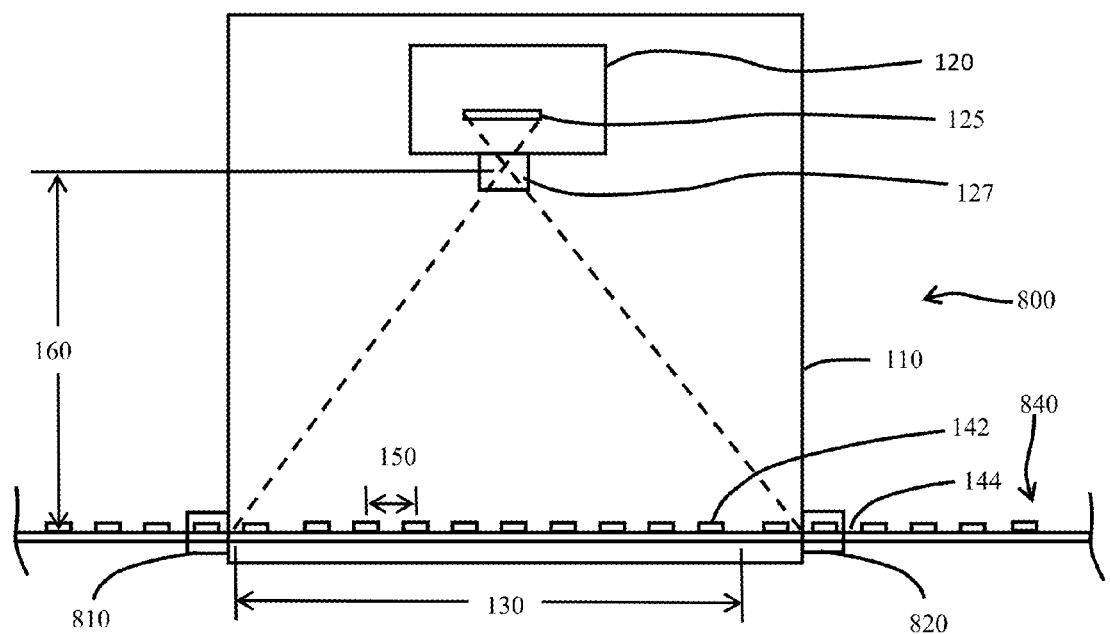
FIGS. 8 and 9A and 9B are schematic illustrations of testing systems in accordance with various embodiments of the invention.

FIG. 8 shows a schematic of a system similar to that described in relation to FIG. 1A, but configured to work in a roll-to-roll configuration. Measurement system 800 of FIG. 8 includes some of the components of measurement system 100 of FIG. 1A, for example imaging system 120, lens 127, and enclosure 110. Web 840 shown in FIG. 8 is a portion of a longer web including or consisting essentially of substrate 140 over which is disposed an array of LEEs 142. In various embodiments of the present invention, the web 840 may have a width in the range of about 3 mm to about 1000 mm; however, the width of the web 840 is not a limitation of the present invention, and in other embodiments the web 840 may have any width. In various embodiments of the present invention, web 840 may have a length of at least about 50 meters or at least about 100 meters or at least about 250 meters or at least about 500 meters. In various embodiments of the present invention, enclosure 110 may have one or more ports through which web 840 passes into and out of enclosure 110. For example in FIG. 8, a port 810 may be utilized as an input port and a port 820 may be utilized as an output port for web 840; however, in other embodiments the functions of ports 810 and 820 may be reversed. In various embodiments of the invention, the measurement system 800 may evaluate optical and/or electronic characteristics of portions of web 840 while web 840 is in motion during the roll-to-roll process. In other embodiments, the web 840 stops within enclosure 110 at regular periods for measurement.

Figure 9A:
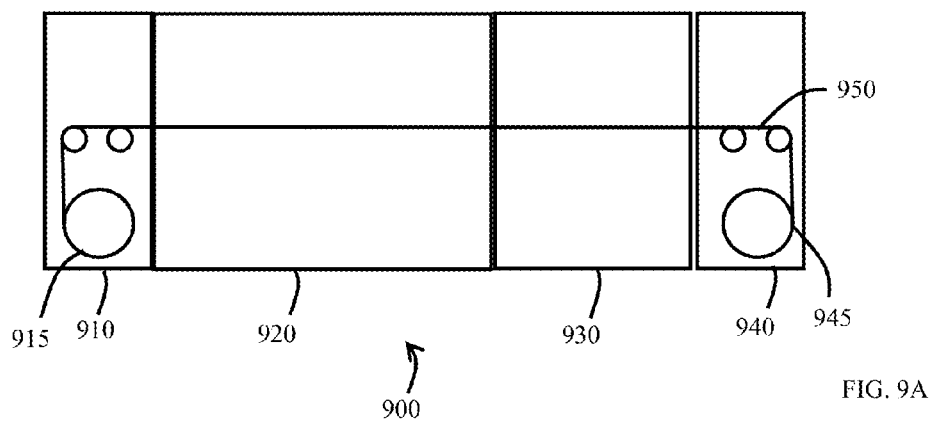

In various embodiments of the present invention, the test system of the present invention may be incorporated into a roll-to-roll manufacturing line, to combine at least portions of the manufacturing and testing or web-based lighting into one tool. However, this is not a limitation of the present invention, and in other embodiments test systems of the present invention may be used to test web-based lighting in an off-line fashion (i.e., not integrated into the roll-to-roll manufacturing tool). FIG. 9A shows a schematic of an integrated roll-to-roll system 900 including a web supply unit 910 with supply reel 915, a roll-to-roll fabrication unit 920, a testing system (or "test unit") 930 in accordance with embodiments of the present invention, and a web take-up unit 940 with take-up reel 945. As shown, a web 950 may be utilized in system 900. In various embodiments, a web buffer may be inserted between roll-to-roll fabrication unit 920 and testing system 930, to accommodate and equalize fabrication and test times. Examples of roll-to-roll fabrication unit 920 may include units made by Muhlbauer of Roding, Germany, for example the TAL 15K. In various embodiments, roll-to-roll manufacture may be performed on a PET substrate having conductive aluminum traces and using an anisotropic conductive adhesive (ACA) to electrically couple LEEs 142 and other optional components to the conductive aluminum traces, for example as described in U.S. patent application Ser. No. 13/171,973, filed on Jun. 29, 2011, the entirety of which is incorporated by reference herein. In various embodiments of the present invention, measurement or analysis data taken from testing system 930 may be used in real time or in near real time, with or without a direct feedback path to fabrication unit 920, for in-line control of the fabrication process. For example, such measurement or analysis data may be used to ensure the correct LEEs 142 are being used, to identify various failures in the manufacturing process, for example missing components, misplaced components, incorrect components or the like, and to provide real-time or near real-time feedback to the manufacturing process.

Figure 9B:
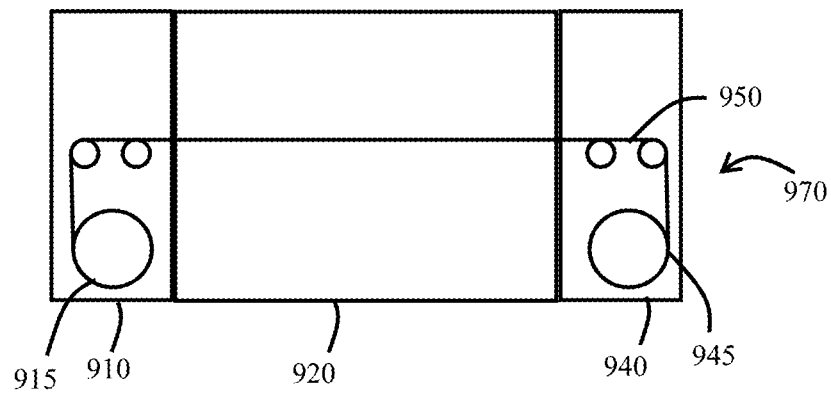

FIG. 9B shows an example of a roll-to-roll system in which a test system 971 is separate from a fabrication system 970. In this example, the lighting system is first fabricated on fabrication system 970 and taken up on a take-up reel 945. Take-up reel 945 or material from take-up reel 945 is transferred to a supply reel 960 on test system 971. Web 950 is tested in test system 971 and tested material is taken up on a take-up reel 965. In various embodiments of the present invention, take up reel 945 may be utilized as supply reel 960; however, in other embodiments these may be two separate elements, for example if there is an intervening step between fabrication and testing.

In various embodiments of the present invention, a virtual map of the characteristics of the test sample may be made using the test data. Various map configurations may be employed. For example, in various embodiments of the present invention, the test sample is a discrete unit (i.e., manufactured in sheet form and not in roll-to-roll form), and a map of the characteristics of the test sample may include one or more characteristics of each LEE 142, one or more sheet or sample-level characteristics or information on out-of-specification or non-functional components, for example out-of-specification LEEs 142 as well as location information, for example row and column indices for each component, permitting location and identification of failed or our-of-specification components or sheets. In various embodiments, the map may include the location of out-of-specification components, which may be subsequently used for removal or rework of such components or removal of an out-of-specification or non-functional portion of the web. In various embodiment of the present invention, the map may be used for identification of out-of-specification sheets.

In various embodiments of the present invention, the test sample is part of a web, and a map of the characteristics of the various components along with their location information may be used for subsequent rework or removal of various out-of-specification portions of the web. In various embodiments of the present invention, a web may be virtually divided into sections, for example based on viewing area 130 of test system 100. In such embodiments, the test data for each portion of the sample that is imaged within viewing area 130 may be assigned an identification value, for example an identification number. In various embodiments, multiple viewing areas may be assigned to groups, for example lots, with their own identification values.

In various embodiments of the present invention, the testing system may be used to identify various portions of the web that meet different levels of requirements, and such information may be used to sort or bin portions of the web into two or more groups, each group meeting different requirements. For example, one group or bin may have a luminous flux within a certain range, while a second and/or third bin may have a luminous flux in a second and/or third range. For example, the luminous flux may be measured on a unit area basis, or a linear area basis, or by string or by viewing area. For example, in various embodiments of the present invention, the web may be binned for luminous flux in one meter or one foot lengths. The specific unit for binning or sorting is not a limitation of the present invention. Other characteristics that may be used for sorting or binning include CCT, CRI, R9, spectral power distribution, string voltage, luminous efficacy, or the like.

In various embodiments of the present invention, the web may have traceability markings at specific positions along the web to aid in identifying and locating specific components. For example in various embodiments, the web may have a unique identifier, for example a length identifier, every 1 foot or every 1 meter. In various embodiments, the length may be the viewing area or a multiple of the viewing area. The specific value of the length identifier is not a limitation of the present invention. In various embodiments, such traceability markings may include or consist essentially of one or more of an ink mark, a label, a bar code, a laser mark or the like; the specific type of mark or label is not a limitation of the present invention.

In various embodiments of the present invention, the virtual map may be supplemented with or replaced by physical markings on the sheet, web or component, for example to indicate out-of-specification components or portions of the web or sheet. For example, in various embodiments of the present invention, a mark, for example an ink mark, may be formed on a component or on the substrate or sheet or web, for example adjacent to an out-of-specification component or string of LEEs 142 or group of LEEs 142 to indicate out-of-specification components or portions of the sheet or web.

In various embodiments of the present invention, the testing system may be utilized to test other characteristics of the sample or additional functionality of the sample. Examples of such characteristics or additional functionality may include but are not limited to dimming performance, color tuning performance, response to communication and/or control signals (both to the test sample and from the test sample), sample temperature (for example at one or more points on the sample), health monitoring of the sample (for example reporting on sample temperature, electrical or optical characteristics, lifetime or the like), response to different temperature ambients, response to different energization levels, electromagnetic interference (EMI), or the like.

In various embodiments of the present invention, the sample to be analyzed includes or consists essentially of a light-emitting system that is dimmable, i.e., the radiant flux or the luminous flux of the system may be varied. In such embodiments, testing systems of the present invention may include testing of the dimming performance. For example, a dimming signal may be applied to one or more portions of the sample under test and the radiant flux or luminous flux or light output power may be determined as a function of the dimming signal. For example, the dimming signal may include a signal to the power supply energizing the lighting system, and in response to such signal, the voltage or current to the lighting system may be modified to change the light output. For example, in various embodiments of the present invention, the voltage or current to the lighting system may be modulated, for example by pulse-width modulation (PWM), such that when the modulated power has a relatively high duty cycle the light output is relatively higher than when the modulated power has a relatively low duty cycle. In various embodiments, a lighting system may have a specific relationship between the control signal, for example a 0-10 V signal, or the PWM duty cycle of the power applied to the lighting system and the light intensity (for example luminous flux), and this relationship may be determined or validated by the test system by modifying the control signal or PWM duty cycle of the power applied to the lighting system and the light intensity measured and then comparing that to the desired relationship. In various embodiments of the present invention, the dimming performance may be determined to be within specification if the measured value of the light output for each applied control signal or PWM duty cycle is within a certain range from the desired value, for example within about ±20% or within about ±10% or within about ±5%. In addition to the relationship between the dimming signal and the light output, various other parameters may be evaluated, for example the dimming rate (for example the rate at which the light output changes with respect to a change in the dimming signal, flicker, jitter or stability of the light output intensity as a function of dimming signal, spectral properties, for example CCT and CRI as a function of dimming signal, and the like. For example, flicker, jitter, or stability of the light output intensity as a function of the dimming signal may be measured by applying a fixed dimming signal and taking successive images in time and comparing various parameters of the images, for example the total light intensity or the light intensity (for example luminous flux) of each LEE 142 or group of LEEs 142. If there are changes in the light intensity in successive images, the range or other characterizations of the changes may be compared to a specification to determine if the performance is out-of-specification or not.

In various embodiments of the present invention, the sample to be analyzed includes or consists essentially of a light-emitting system that tunable, that is the color or one or more other optical characteristics of the system may be varied. For example, in various embodiments of the present invention, the system may be color tunable and able to produce a wide range of colors, for example all or substantially all or a portion of the CIE color gamut. In various embodiments of the present invention, the sample may include or consist essentially of one or more LEEs 142 each emitting in the red, green, blue wavelength ranges. In various embodiments of the invention, the sample may also include white light emitters. In various embodiments of the present invention, the sample may emit white light which has a tunable CCT, for example in the range of about 2000K to about 20,000K. In various embodiments of the present invention, the sample may be energized and provided with one or more tuning signals to change the color or other optical characteristics, for example, CRI, R9, spectral power density, or the like, and the test system of the present invention may be used to evaluate the performance of the system at different tuning conditions.

In various embodiments of the present invention, color tuning may be characterized by a color tuning signal, for which there is a desired response, for example a desired CCT of the lighting system. In various embodiments of the present invention, a series of color tuning signals may be applied to the lighting system, and one or more images taken of the lighting system at each color tuning signal setting, and the CCT (or other spectral characteristics) may be determined for each color tuning signal setting and compared to the desired CCT for each setting. In various embodiments of the present invention, if the measured CCT at each color tuning signal setting is within a certain range from the desired CCT value, then the lighting system is within specification. For example, if the measured CCT is within about ±20% or within about ±10% or within about ±5% or within about 250 K or about 100K or about 50K or about 20K or less of the target value, the lighting system may be considered to be within specification. In various embodiments of the present invention, the lighting system may be configured for one or two-way communication and/or control with a control or monitoring system. In various embodiments of the present invention, the communication and/or control functionality may be evaluated by applying one or more communication and/or control signals or a successive series of communication and/or control signals to the lighting system and taking one or more images of the lighting system under each communication and/or control setting/signal and determining one or more parameters of the lighting system from the images at each communication and/or control signal setting and/or from one or more electrical parameters from SMU 182 or an equivalent system. If the measured value is within a certain range of the target parameter, then the lighting system may be determined to be within specification.

While the discussion herein has been mainly related to detection of radiation in the visible wavelength range, this is not a limitation of the present invention, and in other embodiments radiation outside of the visible radiation range may be analyzed as well, for example UV, IR, x-ray radiation, or the like. In various embodiments of the present invention, thermal radiation, for example IR radiation, may be detected and imaged to produce a thermal or heat map of the sample. For example, in various embodiments of the present invention, the temperature of each LEE 142 or other electronic or optical components within the analysis area may be determined and optionally used for one or more pass/fail criteria. For example, the temperature of each LEE 142 or current control element or component may be determined and a fail criteria may be set for a temperature above about 50° C., or above about 60° C., or above about 75° C., or above about 100° C., or above about 125° C.

In various embodiments of the present invention, the image of the sample may be analyzed optically to determine physical or mechanical failures, for example missing components, misaligned components, misplaced components, or the like. In various embodiments, the same image or set of images used for determining spectral properties may be used for automatic optical inspection of the sample; however, this is not a limitation of the present invention, and in other embodiments different cameras or sensors may be used for generating different images for use in the analysis. For example, in various embodiments of the present invention, the image may be formed while LEEs are energized or not energized. In various embodiments of the present invention, the analysis may include combining analysis of one or more images of energized and/or non-energized samples.

In various embodiments, imaging system 120 may include or consist essentially of one or more UV sensors or UV imaging cameras. For example, UV sensors or cameras may be used to assess UV radiation for compliance to various photobiological requirements.

In various embodiments of the present invention, imaging system 120 may include or consist essentially of at least one of the following: an imaging colorimeter, a visible light camera, an IR camera, an IR sensor, a spectrometer, a UV camera, a UV sensor, an x-ray camera, or an x-ray sensor.

In various embodiments of the present invention, data from two or more wavelength ranges, or from two or more cameras and sensors, or images from the sample in an energized and non-energized state, may be combined or merged together for characterization of the sample, or for determining pass/fail criteria. For example, in various embodiments of the present invention, a component may pass individual criteria, but fail because of a combination of values from different tests. For example, in various embodiments of the present invention, an LEE may fail as a result of exceeding a temperature value and a flux value, each of which individually may be acceptable if the other parameter did not exceed its threshold value. Such use of the combination or fusion of sensor data may permit improved characterization of test samples.

In various embodiments of the present invention, imaging system 120 or sensors, for example sensors 170 of FIG. 1C, may detect only intensity and not spectral data, and greyscale data acquired thereby is used to evaluate sample 140. Such cameras or sensors may detect radiation over a relatively wide or relatively narrow wavelength range, but would not provide information as to the intensity as a function of wavelength within the detected wavelength range. For example, in various embodiments of the present invention, imaging system 120 is a camera, for example a monochrome camera, that records a single greyscale image of the illuminated sample, for example similar to that shown in FIG. 4A. In contrast to an imaging colorimeter, such a monochrome camera is relatively less expensive and may be able to take and process images faster than an imaging colorimeter using multiple exposures through different filters. While such a monochrome or greyscale system may be unable to provide as complete a set of information about sample 140, in some applications an evaluation of intensity, whether calibrated or relative, may be sufficient.

Calibration of test and evaluation systems of the present invention may be accomplished using a variety of means. In various embodiments, one or more "golden samples," i.e., samples that are precisely calibrated using other, potentially more accurate equipment and that are stored and evaluated on a regular basis to understand their characteristics, may be used as calibration sources for test systems of the present invention. For example, in various embodiments, a golden sample array may be manufactured and tested in an integrating sphere to determine sample array characteristics, for example spectral power density, luminous flux, CCT, CRI, R9, and the like, and these values used to calibrate the sample array values measured using test systems of embodiments of the present invention. In various embodiments of the present invention, the characteristics of each LEE on a golden sample array may be individually determined and then used to calibrate the individual LEE values measured using test systems of embodiments of the present invention. In various embodiments of the present invention, a manual, semi-automated or automated test system using a relatively small integrating sphere that measures the characteristics of only one emitter in the array may be used to determine the calibration data. In various embodiments of the present invention, a spectroradiometer may be used to determine the calibration data.

In various embodiments of the present invention, the golden sample may include or consist essentially of only an array of LEEs that may be used to provide the calibration data. For example, in a system having a monochrome camera or sensor, the intensity of the golden sample array, or the individual intensities of the LEEs in the golden sample array, may be utilized to set the intensity calibration of the system.

In various embodiments of the present invention, the golden sample may include or consist essentially of only one LEE that may be used to provide the calibration data. For example, in a system having a monochrome camera or sensor, the intensity of a single golden sample LEE may be utilized to set the intensity calibration of the system.

In various embodiments of the present invention, a golden sample or golden sample array may be disposed on a probe card, facing towards the imaging system or sensor, or may be positioned on the probe card, facing towards the camera or sensor, to facilitate calibration.

In various embodiments of the present invention, the golden sample may have the same LEE pattern as the array or sample to be measured. In various embodiments of the present invention, one or more LEEs used for the golden sample may have relatively small variations in optical and/or electrical performance. For example, golden sample LEEs may be measured and binned to have less than about 2 SDCM, or less than about 1 SDCM or less than about 0.5 SDCM, or less than about 0.25 SDCM, or less than about 0.1 SDCM variation in CCT, or have been measured to have less than about 10%, or less than about 5%, or less than about 2%, or less than about 1% variation in light output intensity, or any combination of said criteria. In various embodiments of the present invention, golden sample LEEs may have a CCT or light output intensity or an average CCT or average light intensity that is the same as or substantially the same as that of the sample to be measured. In various embodiments of the present invention, the golden sample may include one or more LEE having one or more variations in optical and/or electrical properties, and these variations may be tabulated and used as a correction during the calibration process. For example, a map of a characteristic on an individual LEE basis, for example the luminous flux or CCT, may be made using a calibration system, and then the same golden sample may be measured in a test system of the present invention and the calibration process in part includes correlation and optionally correction on an individual LEE basis.

In various embodiments of the present invention, one or more optical characteristics may be measured by two different systems, for example a colorimeter and an integrating sphere. In various embodiments of the present invention, one such measurement may be corrected to agree with the value determined from the other measurement. For example, in various embodiments of the present invention, the luminous flux and CCT of sample 140 may be determined by a colorimeter and an integrating sphere and the value determined by the colorimeter corrected to match or substantially match that measured by the integrating sphere. In various embodiments, the value determined by the colorimeter is the average of the value determined for each LEE and the colorimeter value for each LEE may also be corrected by the correction factor in a similar fashion to the manner in which the average of all LEE values measured by the colorimeter is corrected to the value determined by the integrating sphere.

Figure 10:
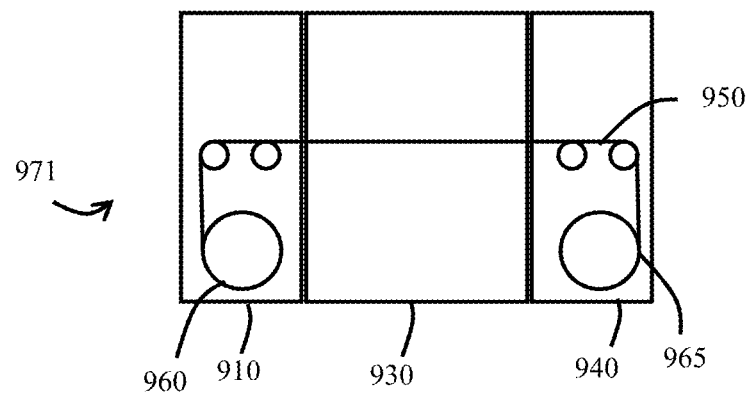
FIG. 10 is a cross-sectional view of a probe card usable in various embodiments of the invention.
Figure 10:
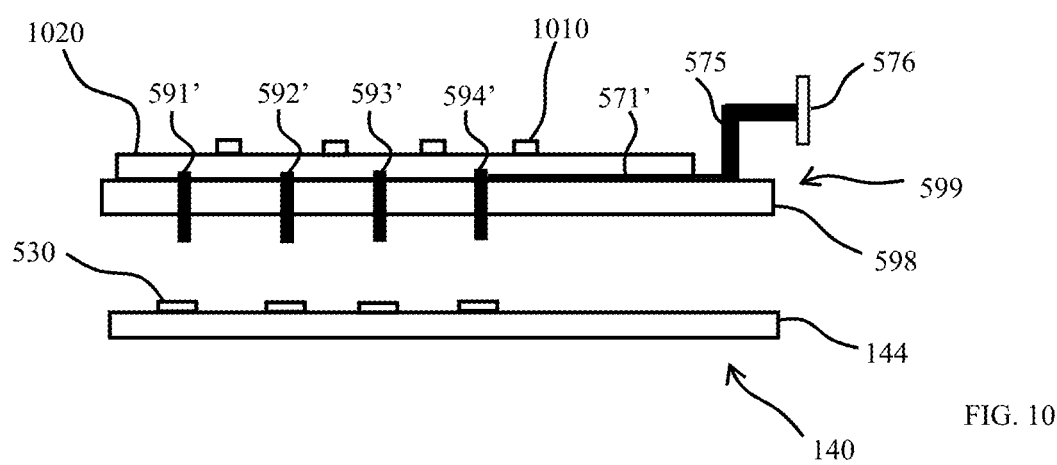

One example of a probe card is shown in FIG. 10, which depicts the probe card of FIG. 5E with the addition of a base 1020 on which are disposed one or more golden sample LEEs 1010. In various embodiments of the present invention, base 1020 and golden sample LEEs 1010 may be a part of probe card 599, while in other embodiments base 1020 and golden sample LEEs 1010 may be removable from probe card 599. In various embodiments, the intensity of one or more golden sample LEEs 1010 is used to calibrate the camera or sensors, in order to provide an accurate measurement. In various embodiments of the present invention, the sensor or camera is calibrated on a periodic basis, for example at the start of every shift, every day, every week, or at other suitable periods. While the approach of calibration using golden samples has been discussed with respect to monochrome cameras or sensors, this approach is also applicable to color-sensing cameras or sensors, for example to provide a calibration source for light intensity.

In various embodiments, testing systems of the present invention may be monitored and/or controlled remotely. For example, a testing system in one location may be monitored in a different location to permit monitoring of sample quality or quantity, for example monitoring the quality and/or quantity of material being produced at a remote manufacturing location or a contract manufacturer. In various embodiments, testing systems of the present invention may be monitored and/or controlled remotely. For example, a testing system in one location may be controlled from a different location to permit control of quality or quantity being tested and/or produced, for example controlling the quality and/or quantity of material being produced at a remote manufacturing location or a contract manufacturer.

Figure 11A:
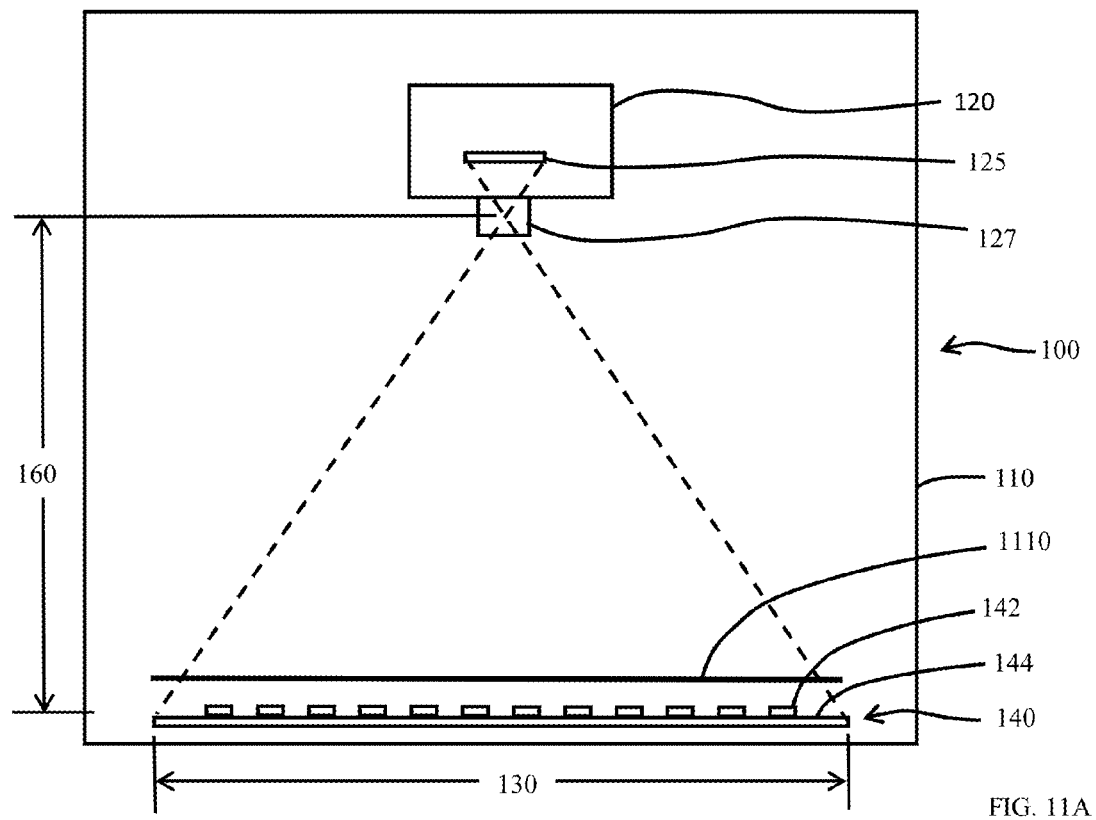
FIG. 11A is a schematic illustration of a testing system in accordance with various embodiments of the invention.

In various embodiments of the present invention, one or more optical elements may be placed in between LEEs 142 and imaging lens 127 or sensors 170. For example, FIG. 11A shows a test system of the present invention, similar to that of FIG. 1A, but including an optical element 1110. In various embodiments of the present invention, such optical elements may be part of sample 140; however, this is not a limitation of the present invention, and in other embodiments such optical elements may be a part of the testing system. For example, testing systems of the present invention may be utilized to measure optical parameters of a lighting system incorporating a diffuser over all or a portion of LEEs 142 or a lighting system that may be positioned behind a diffuser, such diffuser being positioned, perhaps temporarily, within the testing system. In various embodiments of the present invention, such a system may be used to measure optical parameters as discussed herein, and may also be used to measure other characteristics such as intensity and color uniformity over the area of a diffuser or optical element.

Figure 11B:
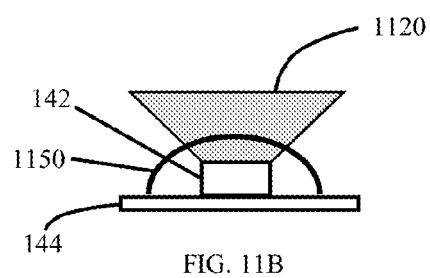
FIGS. 11B and 11C are schematic illustrations of light-emitting elements having different light-distribution patterns in accordance with various embodiments of the invention.
Figure 11C:
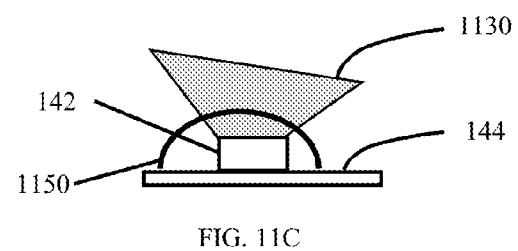

In various embodiments of the present invention, the optical element over LEEs 142 may include an optical element such as a lens, for example a refractive optic, a reflective optic, a Fresnel optic or a total internal reflection (TIR) optic. In various embodiments, sample 140 may include one or more lenses positioned over LEEs 142, for example one lens over each LEE 142; however, this is not a limitation of the present invention, and in other embodiments other lens and optic configurations may be utilized. In various embodiments of the present invention, the optical elements may be utilized to modify or engineer the light distribution pattern from the LEEs 142 and/or sample 140. For example, a lens may be designed to produce a wide spread of light, a collimated beam of light, an asymmetric beam of light, an asymmetric distribution pattern or the like. Testing systems in accordance with embodiments of the present invention may be utilized to determine the spatial component of optical characteristics of such samples or lighting systems. For example, such characteristics may include the light distribution characteristics as a function of position of sample 140 or may also include the light distribution characteristics of each LEE. For example, a lens positioned over a LEE will have a different intensity distribution pattern (and potentially different color characteristics) depending on the alignment of the lens to the LEE. For example, as shown in FIG. 11B, in various embodiments of the present invention, lens 1150 may have an optical axis that is optically aligned or substantially optically aligned with a LEE 142, producing an optical light distribution pattern 1120 that is symmetric or substantially symmetric about the optical axis, whereas in other embodiments the optical axis of lens 1150 may not be optically aligned with LEE 142, producing an asymmetric optical light distribution pattern 1130, as shown in FIG. 11C. It should be noted that the examples shown in FIGS. 11A-11C are exemplary and other embodiments may include other configurations of optics and LEEs.

In general in the above discussion the arrays of semiconductor dies, light-emitting elements, optics, and the like have been shown as square or rectangular arrays; however this is not a limitation of the present invention and in other embodiments these elements may be formed in other types of arrays, for example hexagonal, triangular or any arbitrary array. In some embodiments these elements may be grouped into different types of arrays on a single substrate.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A testing system for testing a light-emitting device comprising a plurality of discrete light-emitting elements disposed over a substrate, the testing system comprising:
 a power source for energizing at least some of the discrete light-emitting elements;
 an imaging system for acquiring at least one image of all of the energized light-emitting elements within a field of view of the imaging system during energization of the light-emitting elements; and
 an analyzer for individually determining for each of the energized light-emitting elements within the field of view, from the at least one image, (i) at least one of the radiant flux or the luminous flux, and (ii) at least one optical characteristic comprising one or more of (a) one or more tristimulus color values, (b) chromaticity coordinates, (c) peak wavelength, (d) dominant wavelength, (e) correlated color temperature, (f) color rendering index, or (g) R9,
 wherein the analyzer is configured to, from the at least one image, determine locations of non-functional light-emitting elements.

2. The testing system of claim 1, wherein the analyzer is configured to determine locations of non-functional light-emitting elements having at least one optical characteristic that is outside of a target range.

3. The testing system of claim 2, wherein the target range is (i) pre-defined and stored within a memory of the analyzer, or (ii) determined at least in part from at least one optical characteristic of one or more of the imaged light-emitting elements.

4. The testing system of claim 1, wherein the analyzer is configured to determine, from the at least one image, a collective optical characteristic of the imaged light-emitting elements.

5. The testing system of claim 1, further comprising a probe card configured to electrically couple the power source to the light-emitting device.

6. The testing system of claim 1, wherein the imaging system comprises at least one of a camera or an imaging colorimeter.

7. The testing system of claim 1, wherein the at least one image consists of a single greyscale image of the imaged light-emitting elements.

8. The testing system of claim 1, wherein the at least one image comprises at least three images collectively defining a tristimulus image.

9. The testing system of claim 1, further comprising a housing for at least partially enclosing therewithin at least some of the light-emitting elements.

10. The testing system of claim 1, wherein the analyzer is configured to detect, from the at least one image, a physical characteristic of the light-emitting device.

11. The testing system of claim 10, wherein the physical characteristic comprises at least one of a temperature of at least one light-emitting element, a temperature of at least a portion of the substrate, a missing light-emitting element, a misoriented light-emitting element, one or more fiducial marks on the substrate, one or more marks on the substrate indicating an out-of-specification component, or a bar code disposed on the substrate.

12. The testing system of claim 1, wherein the analyzer is configured to determine an electrical characteristic of the light-emitting device.

13. The testing system of claim 12, wherein the electrical characteristic comprises at least one of current supplied to at least one light-emitting element, voltage drop across at least one light emitting element, current supplied to the energized light-emitting elements, voltage drop across the energized light-emitting elements, power supplied to at least one light-emitting element, or power supplied to the energized light-emitting elements.

14. The testing system of claim 1, wherein:
 the light-emitting device comprises (i) a first and second spaced-apart power conductors, and (ii) a plurality of light-emitting strings, each light-emitting string (a) comprising a plurality of interconnected light-emitting elements spaced along the light-emitting string, (b) having a first end electrically coupled to the first power conductor, and (c) having a second end electrically coupled to the second power conductor, the power conductors supply power to each of the light-emitting strings, and the power source is configured to energize the energized light-emitting elements by energizing at least a portion of at least one light-emitting string.

15. The testing system of claim 14, wherein:

the power source is configured to energize the energized light-emitting elements by (i) energizing a first portion of a light-emitting string and, thereafter, (ii) energizing a second portion of the light-emitting string, wherein the first and second portions collectively include all light-emitting elements in the light-emitting string; and the imaging system is configured to (i) acquire a first image when the first portion of the light-emitting string is energized and (ii) acquire a second image when the second portion of the light-emitting string is energized.

16. The testing system of claim 14, wherein the power source is configured to energize the energized light-emitting elements by energizing at least said portion of at least one light-emitting string without energizing any light-emitting elements not disposed within the at least one light-emitting string.

17. The testing system of claim 1, further comprising:

a supply roll for supplying the light-emitting device to the testing system; and a take-up roll for receiving the light-emitting device after testing, wherein the imaging system is positioned to (i) receive at least a portion of the light-emitting device from the supply roll and (ii) supply the at least a portion of the light-emitting device to the take-up roll after testing.

18. The testing system of claim 1, wherein the analyzer is configured to determine, from the at least one image, at least one of a dimming performance, a color tuning performance, a temperature, or a response to a communication and/or control signal of the imaged light-emitting elements.

19. The testing system of claim 1, further comprising a spectrometer for acquiring a spectrum corresponding to light emitted by the energized light-emitting elements within a field of view of the spectrometer during energization of the light-emitting elements.

20. A method of testing a light-emitting device comprising a plurality of discrete light-emitting elements disposed over a substrate, the method comprising:

supplying power to at least some of the light-emitting elements of the light-emitting device for energization thereof;

thereduring and with an imaging system, acquiring an image of at least some of the energized light-emitting elements;

while acquiring the image, substantially preventing light other than light emitted by the energized light-emitting elements from reaching the imaging system;

analyzing the image to individually determine, for each of the light-emitting elements in the image, (i) at least one of the radiant flux or the luminous flux, and (ii) an optical characteristic comprising one or more of (a) one or more tristimulus color values, (b) chromaticity coordinates, (c) peak wavelength, (d) dominant wavelength, (e) correlated color temperature, (f) color rendering index, or (g) R9; and analyzing the image to determine a location, on the light-emitting device, of a non-functional energized light-emitting element.

21. The method of claim 20, further comprising analyzing the image to determine a collective optical characteristic of the energized light-emitting elements.

22. The testing system of claim 9, wherein an inner surface of the housing is absorptive to light emitted by the light-emitting elements.

23. The method of claim 20, further comprising, while acquiring the image, absorbing light emitted by the energized light-emitting elements that does not reach the imaging system.

24. The method of claim 23, wherein the energized light-emitting elements are disposed within a housing while the image is acquired, an inner surface of the housing being absorptive to light emitted by the light-emitting elements.

25. The testing system of claim 1, wherein the at least one optical characteristic comprises correlated color temperature.

26. The method of claim 20, wherein the optical characteristic individually determined for each of the light-emitting elements in the image comprises correlated color temperature.

* * * * *